(12) United States Patent
Ohira et al.

(10) Patent No.: US 8,886,124 B2
(45) Date of Patent: Nov. 11, 2014

(54) COMMUNICATION DEVICE AND COMMUNICATION METHOD

(75) Inventors: Tomoaki Ohira, Cupertino, CA (US); Mitsuaki Oshima, Kyoto (JP); Masaru Yamaoka, Osaka (JP); Michihiro Matsumoto, Kyoto (JP); Toshiaki Ohnishi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 365 days.

(21) Appl. No.: 13/395,132

(22) PCT Filed: Jun. 30, 2011

(86) PCT No.: PCT/JP2011/003759
§ 371 (c)(1),
(2), (4) Date: Mar. 9, 2012

(87) PCT Pub. No.: WO2012/008108
PCT Pub. Date: Jan. 19, 2012

(65) Prior Publication Data
US 2012/0171952 A1 Jul. 5, 2012

(30) Foreign Application Priority Data
Jul. 12, 2010 (JP) ................................. 2010-158252

(51) Int. Cl.
*H04B 7/00* (2006.01)
*H04B 5/00* (2006.01)
*H04M 1/725* (2006.01)
*H04W 4/20* (2009.01)
*H04W 4/00* (2009.01)

(52) U.S. Cl.
CPC ............ *H04W 4/20* (2013.01); *H04M 1/72525* (2013.01); *H04W 4/008* (2013.01); *H04M 1/7253* (2013.01); *H04M 2250/04* (2013.01)
USPC ........................................ 455/41.2; 455/41.1

(58) Field of Classification Search
USPC .................................................. 455/41.1, 41.2
See application file for complete search history.

(56) References Cited

U.S. PATENT DOCUMENTS 7,072,672 B1   7/2006   Vänskä et al.
7,130,622 B2   10/2006  Vänskä et al.
(Continued)

FOREIGN PATENT DOCUMENTS

JP   2003-234840   8/2003
JP   2006-505182   2/2006
(Continued)

OTHER PUBLICATIONS

International Search Report issued Aug. 16, 2011 in International (PCT) Application No. PCT/JP2011/003759.

*Primary Examiner* — Ping Hsieh
*Assistant Examiner* — Xin Jia
(74) *Attorney, Agent, or Firm* — Wenderoth, Lind & Ponack, L.L.P.

(57) ABSTRACT

A relay device performs Near Field Communication with a terminal device that is a communication terminal device, and processes information received from the terminal device. A loop antenna receives radio waves from the terminal device; an NFC unit performs Near Field Communication with the terminal device via a loop antenna, and receives from the terminal device application identification information, which identifies an application that processes the information received from the terminal device. A controller acquires an application corresponding to the received application identification information, and causes the acquired application to run.

7 Claims, 12 Drawing Sheets

(56) References Cited

U.S. PATENT DOCUMENTS

| | | |
|---|---|---|
| 2005/0222918 A1 | 10/2005 | Vanska et al. |
| 2006/0138224 A1 | 6/2006 | Azami et al. |
| 2009/0014511 A1* | 1/2009 | Morita .......................... 235/375 |
| 2009/0247077 A1* | 10/2009 | Sklovsky et al. ............. 455/41.1 |
| 2010/0082821 A1* | 4/2010 | Rosenblatt et al. ........... 709/228 |
| 2011/0171907 A1* | 7/2011 | Jolivet .......................... 455/41.1 |

FOREIGN PATENT DOCUMENTS

| | | |
|---|---|---|
| JP | 2006-191540 | 7/2006 |
| JP | 4162464 | 10/2008 |
| JP | 2009-087314 | 4/2009 |
| WO | 2004/040923 | 5/2004 |

* cited by examiner

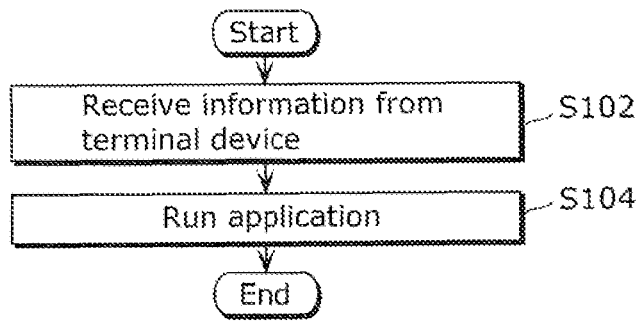
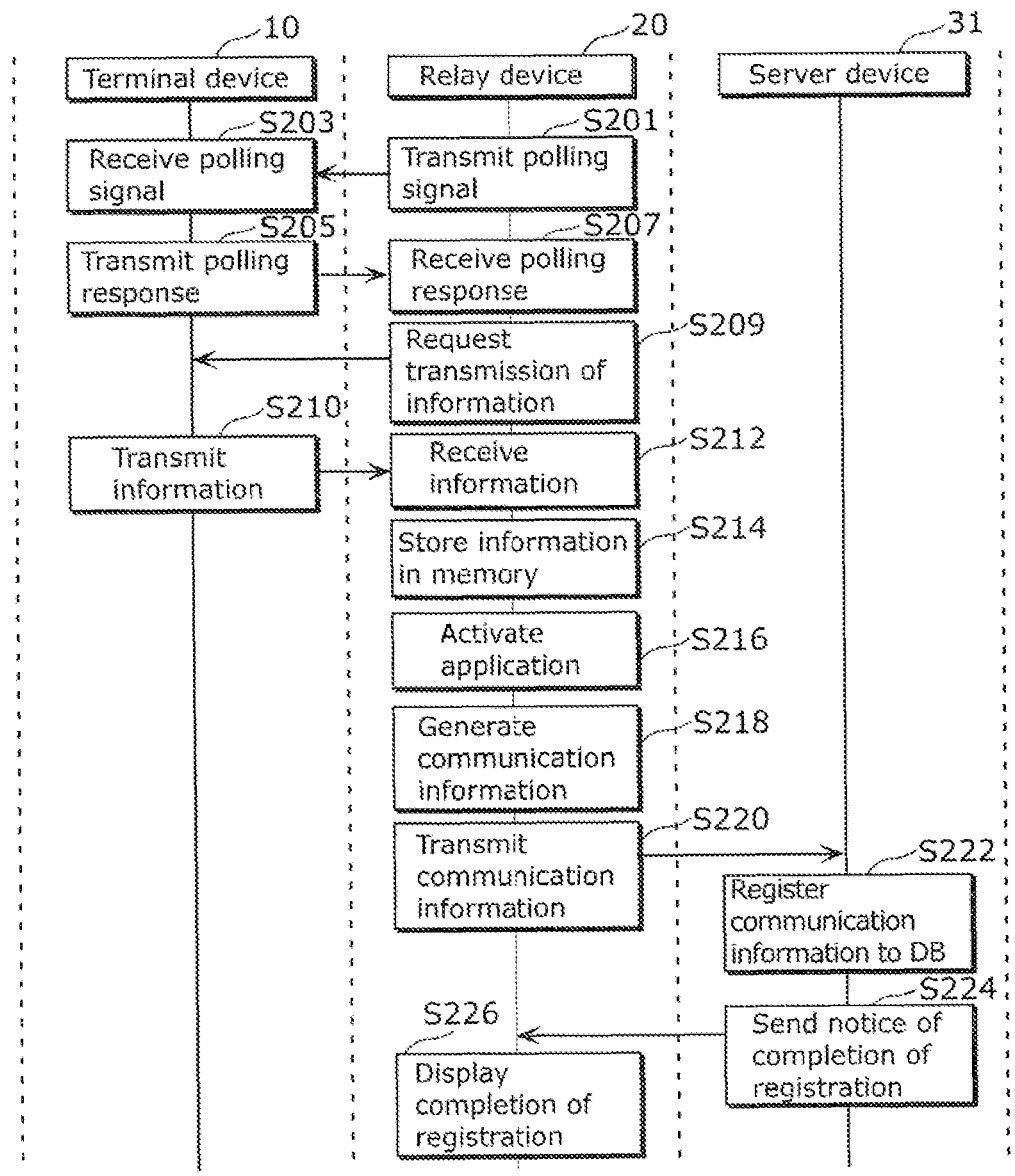

COMMUNICATION DEVICE AND COMMUNICATION METHOD

BACKGROUND OF INVENTION

1. Technical Field

The present invention relates to a communication device and a communication method for wirelessly communicating with a Near Field Communication terminal device using a RFID, and processing information received from the communication terminal device using software.

2. Background Art

A customer management support system (for example, see Patent Literature 1) has been disclosed that supports marketing while securing privacy of customers with minimum customer data by utilizing non-contact information medium.

Patent Literature 1 discloses a customer management support system in which card identification information of non-contact information medium and minimum amount of necessary user information are registered by a user to a management center as customer information via a network, and later, the user places the non-contact information medium near a reader disposed at a facility to receive facility usage information at the management center via a network, and adds the facility usage information to the user information. Specifically, in the customer management support system, a processing unit of the management center registers the customer information to a storage unit to create a database based on the card identification information, and regarding the facility usage information, the reader identification information and the time record are registered to user information related to the card identification information among registered customer data, with the user information associated with the reader identification information and the time record. Furthermore, use trend information of the facility is transmitted to the terminal device of each facility.

In addition, a distribution method and a distributing device of non-contact IC tag that allow a simple registration procedure in an information distribution system using non-contact IC tag has been disclosed (for example, see Patent Literature 2).

In Patent Literature 2, the following has been disclosed. First, when a mobile terminal device is connected to a communication interface; a membership ID of a distributed non-contact IC tag is read by a reader. The mobile terminal device is then controlled by a control unit via the communication interface so as to send an email containing the membership ID to a server. The server, when receiving the e-mail from the mobile terminal device, performs user registration based on the mail address assigned to the mobile terminal device, and the membership ID contained in the e-mail.

CITATION LIST

Patent Literature

[PTL 1]
Japanese Unexamined Patent Application Publication No. 2009-87314
[PTL 2]
Japanese Patent No. 4162464

SUMMARY OF INVENTION

With the above-described conventional configuration, the user information stored in the IC tag is registered to a server device by placing a card-type medium with an IC tag near a reader/writer, the server device being connected via a network, however, it is assumed that application for processing the information read from the IC tag is installed in the reader/writer and is running. Consequently, when a mobile phone or the like is used as a reader/writer, the application may not installed, and thus a user needs to perform a troublesome operation of installing and running the application.

The present invention solves the above-described conventional problem, and it is an object of the invention to provide a communication device and a communication method that can process the information received from the communication terminal device via Near Field Communication without a complicated operation by a user.

In order to solve the above-described existing problem, a communication device according to one aspect of the invention is a communication device which performs Near Field Communication (NFC) with a communication terminal device and processes, by software, information received from the communication terminal device, the communication device including: an antenna unit configured to receive radio waves from the communication terminal device; an NFC unit configured to perform Near Field Communication with the communication terminal device via the antenna unit, and to receive software identification information from the communication terminal device, the software identification information identifying an item of software that processes the information received from the communication terminal device; and a control unit configured to acquire corresponding software which is an item of software corresponding to the received software identification information, and to cause the acquired corresponding software to run.

With this configuration, the communication device receives software identification information via Near Field Communication, the software identification information identifying the software which processes the information received from the communication terminal device, and acquires the software corresponding to the software identification information, then causes the software to run. That is to say, only by establishing Near Field Communication between the communication terminal device and the communication device, the software for processing the received information can be caused to run. Consequently, the information received from the communication terminal device via Near Field Communication can be processed without a complicated operation by a user.

Preferably, the communication device further includes a storage unit configured to store at least one item of software, wherein in the case where the corresponding software is stored in the storage unit, the control unit is configured to acquire the corresponding software from the storage unit and cause the acquired corresponding software to run.

With this configuration, in the case where the corresponding software is stored in the storage unit, the corresponding software is acquired from the storage unit, and is caused to run. That is to say, only by establishing Near Field Communication between the communication terminal device and the communication device, the software stored in the storage unit is automatically caused to run, and the received information is processed by the software. Consequently, the information received from the communication terminal device via Near Field Communication can be processed without a complicated operation by a user.

Preferably, the communication device is connected via a communication network to a storage device which stores at least one item of software containing the corresponding software, the communication device further includes a communication unit configured to communicate with the storage device, the control unit is configured to determine whether or not the corresponding software is stored in the storage unit, based on the software identification information, when it is determined that the corresponding software is stored in the storage unit, the control unit is configured to acquire the corresponding software from the storage unit and cause the acquired corresponding software to run, and when it is determined that the corresponding software is not stored in the storage unit, the control unit is configured to transmit a software transmission request signal to the storage device via the communication unit so as to acquire the corresponding software from the storage device and cause the acquired corresponding software to run, the software transmission request signal requesting transmission of the corresponding application.

With this configuration, in the case where it is determined that the corresponding software is not stored in the storage unit, the corresponding software is acquired via a communication unit from a storage device which is an external server device, and the corresponding software is caused to run. That is to say, only by establishing Near Field Communication between the communication terminal device and the communication device, even when a predetermined software is not stored in the communication device, the predetermined software is automatically caused to run without operating the communication device, and the received information is processed. Consequently, the information received from the communication terminal device via Near Field Communication can be processed without a complicated operation by a user.

Preferably, the NFC unit is configured to further receive storage device identification information which identifies the storage device, from the communication terminal device, and in the case where the control unit determines that the corresponding software is not stored in the storage unit, the control unit is configured to transmit the software transmission request signal via the communication unit to a storage device indicated by the received storage device identification information so as to acquire the corresponding software from the storage device and to cause the acquired corresponding software to run, the software transmission request signal containing the software identification information and communication device identification information which identifies the communication device.

With this configuration, the storage device identification information is received from the communication terminal device, and a software transmission request signal which contains the software identification information and the communication device identification information is transmitted to the storage device indicated by, the storage device identification information, and then the corresponding software is acquired from the storage device and is caused to run. That is to say, by receiving access information to the storage device such as an address of the storage device from the communication terminal device, the storage device can be easily accessed, and by transmitting the software identification information to the storage device, the corresponding software can be easily acquired from the storage device. Therefore, without performing complicated processing, the information received from the communication terminal device via Near Field Communication can be processed.

Preferably, the communication device is connected to a registration device for registering information via a communication network, the NFC unit is configured to further receive, from the communication terminal device, registration device identification information which identifies the registration device and terminal identification information which identifies the communication terminal device, and the control unit causes the corresponding software to run for registering information received from the communication terminal device so as to transmit information containing at least the received terminal identification information to a registration device indicated by the registration device identification information, the information containing at least the received terminal identification information being associated with the communication device identification information which identifies the communication device.

With this configuration, by causing the corresponding software to run, the control unit transmits data containing at least the terminal identification information to the registration device indicated by the registration device identification information with the data associated with the communication device identification information. That is to say, only by establishing Near Field Communication between the communication terminal device and the communication device, the software for processing the received information is automatically caused to run, and furthermore, the terminal identification information is transmitted to the registration device which is an external server device with the terminal identification information associated with the communication device identification information. Accordingly, with a single touch operation by a user, the information received from the communication terminal device via Near Field Communication can be processed, and the information of the communication terminal device can be registered to an external server device.

Preferably, in the case where the NFC unit transmits a polling signal to the communication terminal device, and receives a polling response from the communication terminal device so that Near Field Communication is established, the NFC unit is configured to request the communication terminal device to transmit the software identification information so as to receive the software identification information from the communication terminal device.

With this configuration, the NFC unit establishes Near Field Communication by transmitting a polling signal to the communication terminal device, and then receives software identification information from the communication terminal device. That is to say, when the communication terminal device is a tag device, Near Field Communication can be established between the communication terminal device and the communication device by operating the communication device as a reader/writer device, and thus software identification information can be received.

Preferably, in the case where the NFC unit receives a polling signal from the communication terminal device, the NFC unit is configured to transmit a polling response to the communication terminal device so as to establish Near Field Communication and receive the software identification information from the communication terminal device.

With this configuration, the NFC unit transmits a polling response to the communication terminal device to establish Near Field Communication, and thus receives software identification information from the communication terminal device. That is to say, when the communication terminal device is a reader/writer device, Near Field Communication can be established between the communication terminal device and the communication device by operating the communication device as a tag device, and thus the software identification information can be received.

Preferably, the NFC unit includes a communication mode switching unit configured to switch between a reader/writer mode and a tag mode, the reader/writer mode allowing the NFC unit to perform Near Field Communication with a reader/writer device having a reader/writer function, and the tag mode allowing the NFC unit to perform Near Field Communication with a tag device having an integrated circuit (IC) tag function, and the communication mode switching unit is configured to cause the NFC unit to switch to the reader/writer mode when the communication terminal device is the reader/writer device, and to cause the NFC unit to switch to the tag mode when the communication terminal device is the tag device.

With this configuration, when a communication terminal device is a reader/writer device, the NFC unit is switched to a reader/writer mode, and when a communication terminal device is a tag device, the NFC unit is switched to a tag mode. That is to say, placing the reader/writer device or a tag device near the communication device, Near Field Communication is established between the communication device, and the reader/writer or tag device, and thus a predetermined software can be caused to run automatically. Consequently, regardless of whether the communication terminal device is a reader/writer device or a tag device, the information received from the communication terminal device via Near Field Communication can be processed without a complicated operation by a user.

In addition, the present invention can be achieved not only as such a communication device, but also as an integrated circuit including the processing units that constitutes the communication device, or as a communication method including the steps which are performed by the processing units. Furthermore, the present invention can be achieved as a program which causes a computer to execute those steps, or as a computer readable recording medium such as a CD-ROM on which the program is recorded, or as information, data or a signal which represents the program. The program, information, data, and signal may be distributed via a communication network such as the Internet.

According to the communication device and communication method of the present invention, information received from a communication terminal device via Near Field Communication can be processed without a complicated operation by a user.

BRIEF DESCRIPTION OF DRAWINGS

FIG. 5 is a flowchart illustrating an example of the operation of the relay device in Embodiment 1 of the present invention.

FIG. 6A is a sequence diagram illustrating an example of the operation of the terminal device, the relay device, and a server device in Embodiment 1 of the present invention.

DETAILED DESRIPTION OF INVENTION

Hereinafter, an embodiment of the present invention will be described with reference to the drawings.

[Embodiment1]

In the present embodiment, a communication system is described in detail with reference to the drawings that includes a terminal device having a Near Field Communication function; a relay device configured to perform Near Field Communication with the terminal device; and a server device connected the relay device via a general-purpose network such as the Internet or a mobile telephone network, wherein the communication system registers sensing information and the like of the terminal device to the database of the server device via the relay device.

Figure 1:
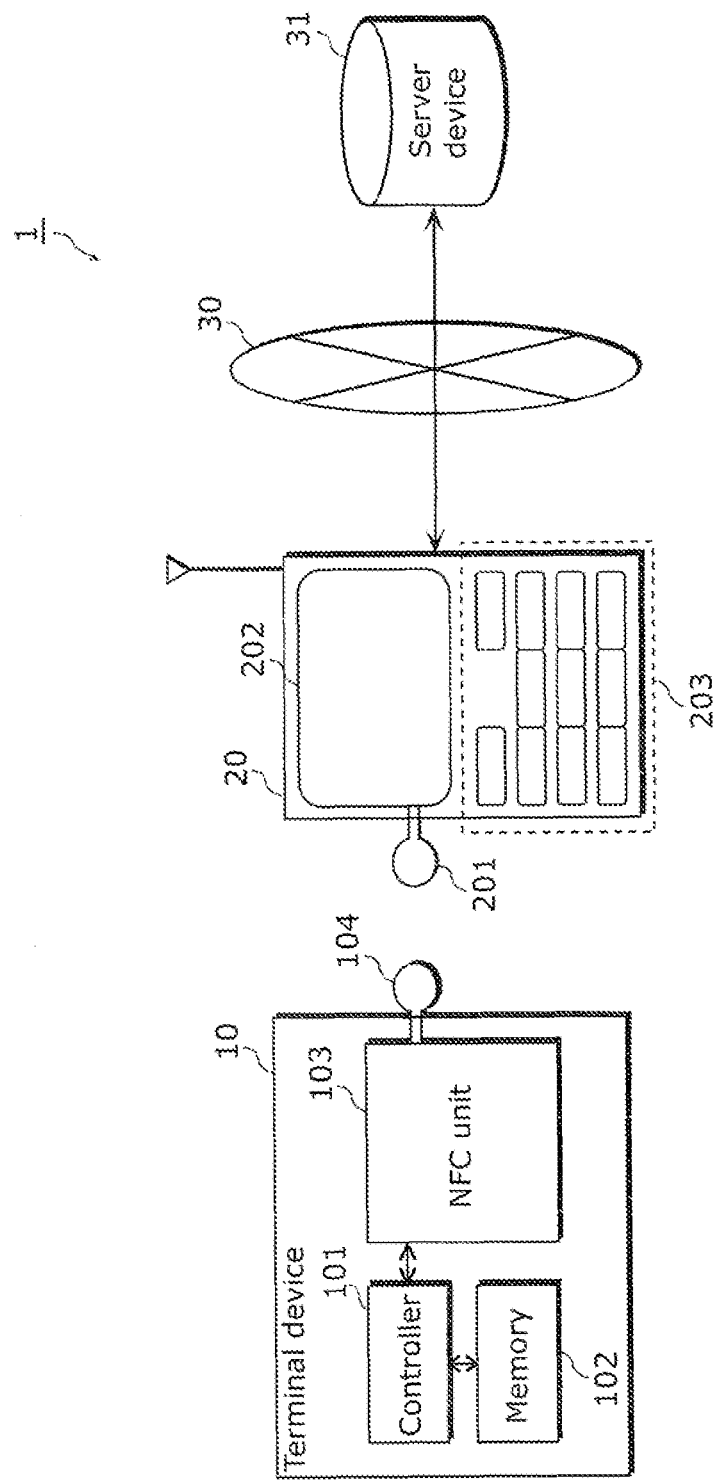
FIG. 1 is a conceptual diagram illustrating an overview of a communication system in Embodiment 1 of the present invention.

FIG. 1 is a conceptual diagram illustrating an overview of a communication system 1 in Embodiment 1 of the present invention.

As indicated in FIG. 1, the communication system 1 includes a terminal device 10, a relay device 20, a network 30, and a server device 31. The terminal device 10 corresponds to the "communication terminal device" described in the appended claims, and the relay device 20 corresponds to the "communication device" described in the appended claims. The relay devices 20 is a mobile terminal such as a smart phone, for example.

Terminal device 10 and relay device 20 can communicate with each other by Near Field Communication. The Near Field Communication in the present embodiment assumes wireless communication between a RFID (Radio Frequency Identification, ISO 14443) tag and a reader/writer, such as electromagnetic induction communication in the 13.56 MHz band (HF band), radio wave communication in 52 to 954 MHz band (UHF band), or NFC (Near Field Communication, ISO/IEC 21481) in the 13.56 MHz band. Normally, the communication ranges of the HF band and the UHF band are limited to several 10 cm and several cm, respectively, and thus, communication is established by placing (contacting) the relay device 20 near (with) the terminal device 10.

The present embodiment may have a configuration in which a reader/writer function is installed on the terminal device 10, and an IC tag function is installed on the relay-device 20, or a configuration in which an IC tag function is installed on the terminal device 10, and a reader/writer function is installed on the relay-device 20 because the primary object of the present embodiment is to provide a configuration in which the terminal device 10 and the relay device 20 can exchange information with each other by Near Field Communication. In the NFC, Peer-to-Peer communication function, tag emulation, and reader/writer emulation are standardized, and in this case, the relationship between the IC tag and the reader/writer may be either configuration.

[Description of Configuration of Relay Device 20]

The relay device 20 includes a loop antenna 201, a display unit 202, and an input unit 203.

The loop antenna 201 is an antenna configured to perform Near Field Communication with an IC tag or a reader/writer of the terminal device 10. That is to say, the loop antenna 201 is an antenna which receives the radio waves transmitted from the terminal device 10. It should be noted that the loop antenna 201 corresponds to the "antenna unit" described in the appended claims.

The display unit 202 includes a liquid crystal display or the like, and is configured to display a result of Near Field Communication with the terminal device 10, and data transmitted from the server device 31.

The input unit 203 is an interface for a user to operate the relay device 20.

The relay device 20 is described in detail later.

[Description of Configuration of Terminal Device 10]

The terminal device 10 includes a controller 101, a memory 102, an NFC unit 103, and a loop antenna 104.

The controller 101 is a CPU which is a system controller of the terminal device 10, and is a component configured to perform system control except for Near Field Communication of the terminal device 10.

The memory 102 is a memory containing non-volatile memory which can store control software to be operated by the controller 101, and all data sensed by the terminal device 10. It should be noted that the memory 102 may be mounted on the inside of an LSI of the controller 101, or may be mounted outside of the LSI. The memory 102 internally includes a non-rewritable ROM area, a rewritable RAM area, and an FW area which stores firmware (FW) which contains the control procedure of the controller 101.

Figure 2:
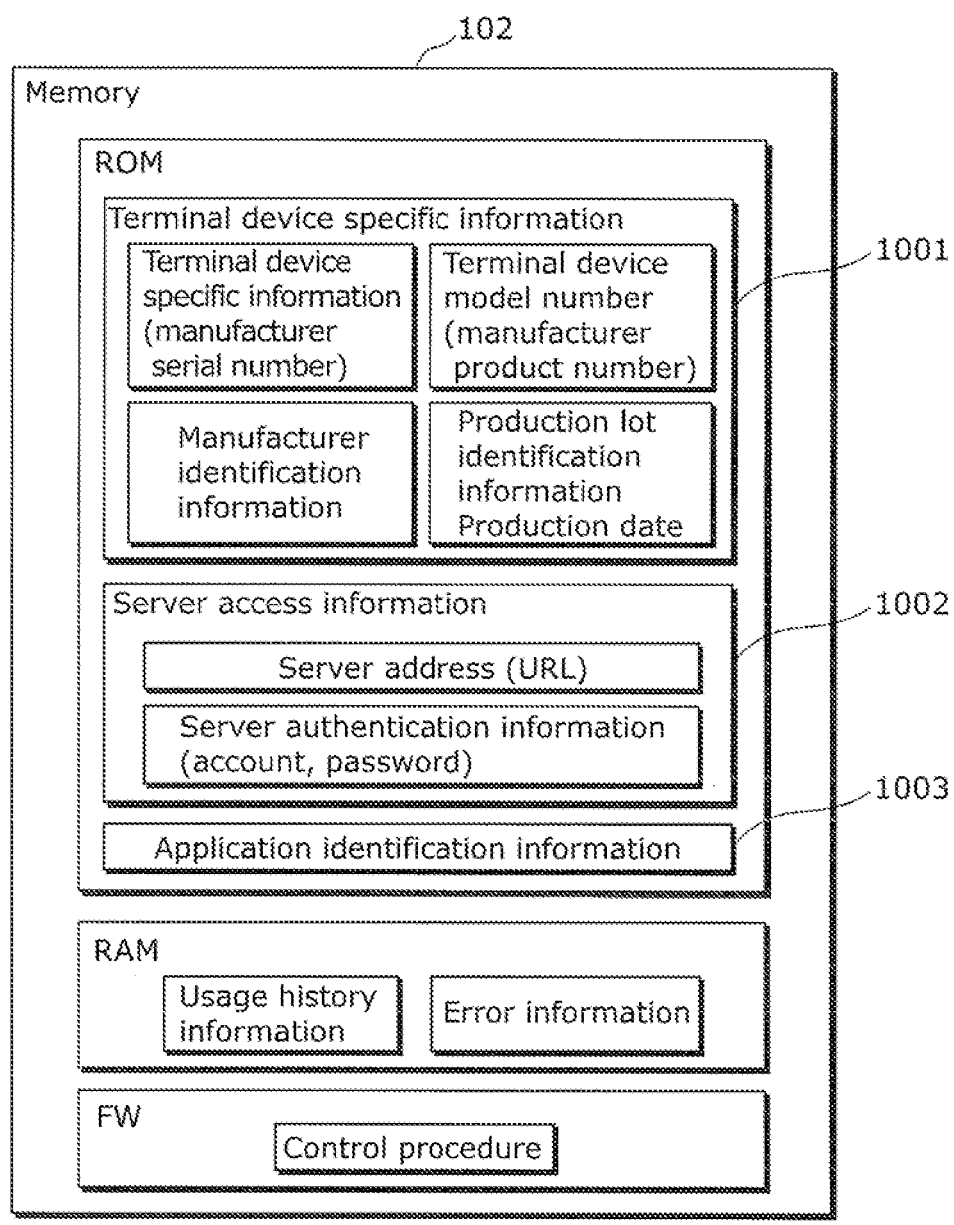
FIG. 2 is a conceptual diagram illustrating the information stored in a memory of a terminal device in Embodiment 1 of the present invention.

FIG. 2 is a conceptual diagram illustrating the information stored in the memory 102 in Embodiment 1 of the present invention.

As illustrated in FIG. 2, the ROM area stores terminal device specific information 1001, server access information 1002, application identification information 1003, and the like.

The terminal device specific information 1001 is terminal device identification information (manufacturer serial number) with which the terminal device 10 can be identified, or information such as a terminal device model number (manufacturer product number), manufacturer identification information, or production date as production lot identification information.

The server access information 1002 is information such as server address (URL (Uniform Resource Locator)), or server authentication information (account, password).

The application identification information 1003 is information which identifies the application that processes the information received from the relay device 20. It should be notes that the application identification information 1003 is included in "software identification information" described in the appended claims.

These pieces of information are recorded in the manufacturing process of the terminal device 10. Accordingly, the terminal device information owned by A company can be prevented from being transferred to the server of B company other than A company.

That is to say, because users' usage history or the like of an in-house product is precious data for a manufacturer and should not be disclosed to other companies, and thus it is essential to connect to a server according to the terminal device 10. The connection to a server according to the terminal device 10 can be achieved by recording the server access information 1002 on the ROM area of the memory 102. The terminal device 10 then transmits these pieces of information to the server device 31 via the relay device 20, thereby enabling the manufacturer to identify the terminal device 10.

The RAM area stores usage history information, error information, and the like of the terminal device 10.

The FW area stores the firmware containing a control procedure of the controller 101. The FW area may be a ROM memory or may be a RAM memory.

Returning to FIG. 1, the NFC unit 103 is a component which communicates with a reader/writer or an IC tag mounted on the relay device 20, modulates data transferred to the IC tag, and demodulates data transferred from the IC tag.

In the case where a reader/writer is mounted on the relay device 20, the NFC unit 103 modulates data transferred to the reader/writer, and demodulates data transferred from the reader/writer. In addition, the NFC unit 103 generates power for establishing at least Near Field Communication based on the radio waves received from the reader/writer of the relay device 20, and extracts a clock signal based on the radio waves from the reader/writer.

In this manner, at least the NFC unit 103 of the terminal device 10 generates power and extracts a clock signal with the radio waves received from the reader/writer, and thus can perform Near Field Communication with the relay device 20 even in a state where the main power supply of the terminal device 10 is off.

The loop antenna 104 is a loop antenna for performing Near Field Communication with a reader/writer or an IC tag of the relay device 20. For example, the terminal device 10 performs polling on the IC tag provided in the relay device 20 via the loop antenna 104, and upon establishment of communication, reads information from the relay device 20, and/or writes information to the relay device 20.

Here, the operation of the controller 101 is described in detail.

When the loop antenna 201 of the relay device 20 is placed near the loop antenna 104 of the terminal device 10, and the controller 101 detects that Near Field Communication is established between the terminal device 10 and the relay device 20, the controller 101 reads the terminal device specific information 1001, the server access information 1002, and the application identification information 1003 that are stored in memory 102, and transmits those information to the relay device 20.

[Description of Configuration of Server Device 31]

The server device 31 is a server provided with a storage device which stores a database or the like, and is connected to the relay device 20 via a communication network. The server device 31 is normally a WEB server with a database. The server device 31 registers the information transferred from the relay device 20 to the database, and transfers a resultant information to the relay device 20, then displays the resultant information on the display unit 202. It should be noted that the server device 31 has the function of "registration device" described in the appended claims.

With the configuration of the communication system 1 described above, the information sensed by the terminal device 10 can be registered to the database of the server device 31 via the relay device 20.

For example, the manufacturer serial number, the model number, and the manufacturer identification information are transferred from the terminal device 10 to the relay device 20 by Near Field Communication, those information enabling the terminal device to be uniquely identified. The relay device 20 then transfers the information received from the terminal device 10 via Near Field Communication to the server device 31 along with the information (such as the mail address, the telephone number, the mobile identification information, SIM (Subscriber Identity Module Card) card ID) for identifying the user who owns the relay device 20 and the relay device 20 itself, and additional information (GPS (Global Positioning System) information, A-GPS (Assisted-GPS) information, location information estimated from the base station of a mobile network) for identifying the position of the relay device 20 in the case where the relay device 20 can sense the positional information. By registering these pieces of information to the database in the server device 31, a burden of inputting various information can be prevented from being imposed on a user, and by simply placing the relay device 20 near the terminal device 10, regular user registration of the terminal device 10 to the server device 31 can be performed.

By sending failure occurrence conditions and usage history information as the sensed information of the terminal device 10, the relevant manufacturer can obtain advantages such as being able to quickly determine an initial failure of a specific lot and to cope with the initial failure, and furthermore, to find the functions used by each user from the usage history information so that the findings can be utilized for the next product development.

[Detailed Description of Relay Device 20]

Next, the relay device 20 in Embodiment 1 of the present invention will be described in detail with reference to the drawings.

Figure 3:
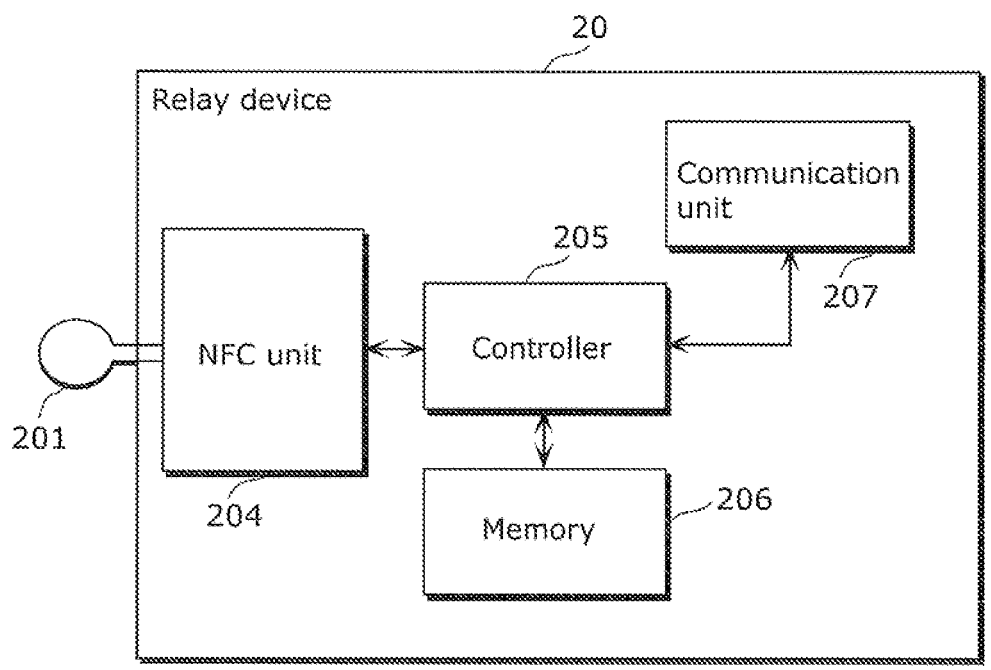
FIG. 3 is a block diagram illustrating the configuration of a relay device in Embodiment 1 of the present invention.

FIG. 3 is a block diagram illustrating the configuration of the relay device 20 in Embodiment 1 of the present invention.

The relay device 20 is a component which performs a mobile telephone function in the case of a mobile phone, or performs a PC function in the case of a personal computer (PC). The relay device 20 of the present embodiment is directed to all of the mobile phone terminals and PCs. Consequently, in the present embodiment, the description of each device is omitted, and only common functions are described.

As illustrated in FIG. 3, the relay device 20 includes an NFC unit 204, a controller 205, a memory 206, and a communication unit 207 in addition to the loop antenna 201.

The NFC unit 204 is a processing unit similar to the NFC unit 103 provided in the terminal device 10. Specifically, the NFC unit 204 performs Near Field Communication with the terminal device 10 via the loop antenna 201, and receives information from the terminal device 10.

Here, the information received from the terminal device 10 by the NFC unit 204 includes the terminal device specific information 1001, the server access information 1002, and the application identification information 1003 that are stored in the memory 102, the application identification information 1003 identifying the application for performing the processing related to the terminal device 10.

It should be noted that the terminal device specific information 1001 and the information contained in the terminal device specific information 1001 corresponds to the "terminal identification information" described in the appended claims. Furthermore, the server access information 1002 is included in "storage device identification information" described in the appended claims.

The controller 205 is a system controller that at least controls the operation of the NFC unit 204, and commands to store the acquired information in the memory 206, and includes what is called a microcontroller and/or a CPU.

Specifically, the controller 205 acquires the corresponding software which is the application corresponding to the application identification information 1003 received by the NFC unit 204, and causes the acquired corresponding software to run. Specifically, in the case where the corresponding software is stored in the memory 206, the controller 205 acquires the corresponding software from the memory 206, and causes the corresponding software to run.

The controller 205, while causing the corresponding software to run, transmits information to the server device 31 with the information associated with the communication device identification information which identifies the relay device 20, and containing at least the terminal device specific information 1001 received by the NFC unit 204. It should be noted that the controller 205 corresponds to the "control unit" described in the appended claims.

The memory 206 internally includes a non-rewritable ROM area, a rewritable RAM area, and an FW area which stores firmware (FW) which contains the control procedure of the controller 205. It should be noted that the memory 206 corresponds to the "memory unit" described in the appended claims.

Figure 4:
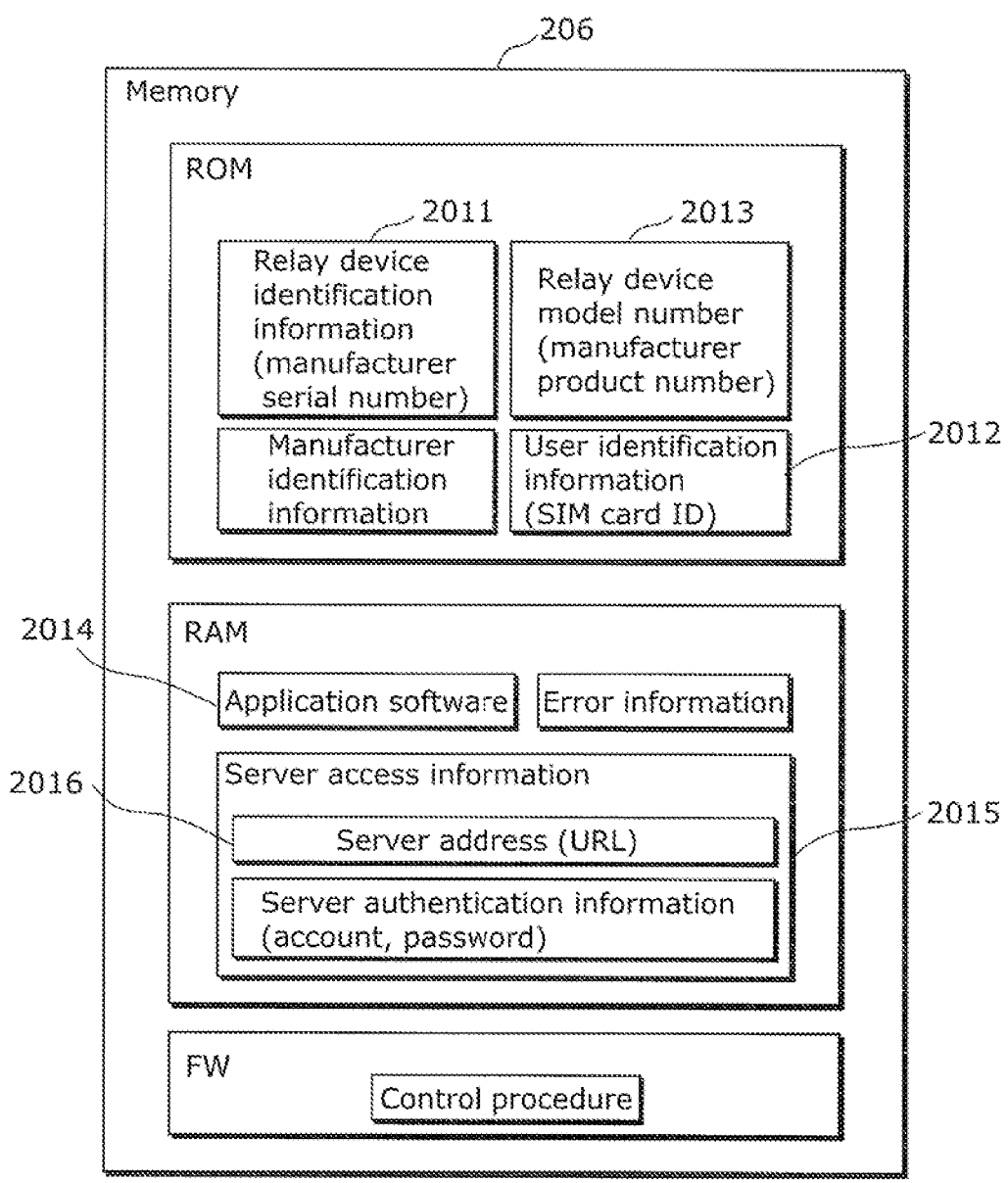
FIG. 4 is a conceptual diagram illustrating the information stored in a memory of the relay device in Embodiment 1 of the present invention.

FIG. 4 is a conceptual diagram illustrating the information stored in the memory 206 in Embodiment 1 of the present invention.

As illustrated in FIG. 4, the ROM area stores information such as the relay device identification information (manufacturer serial number) 2011 which is written to the ROM during the manufacturing process of the relay device 20, the user identification information (such as SIM card ID) 2012 with which a user operating the relay device 20 can be identified, and the relay device model number (manufacturer product number) 2013. It should be noted that the relay device identification information 2011, the user identification information 2012, and the relay device model number 2013 are included in the "communication device identification information" described in the appended claims.

The information in the ROM area is written thereto during the production process of the relay device 20. The ROM area may physically include a rewritable flash memory, however, in that case, the ROM area is managed as a read-only area by the reader/writer of terminal device 10. With the management, malicious manipulations such as unauthorized rewriting of the identification information, unauthorized writing to the server access information can be prevented, and thus the security can be improved.

The RAM area stores, for example, application software 2014 and server access information 2015 for performing registration of regular users of the terminal device 10. Here, the server access information 2015 is the information that contains the server access information 1002 read from the terminal device 10 via Near Field Communication, and is transferred to the server device 31 via the relay device 20.

In addition, the server access information 2015 contains a server address (URL) 2016, and server authentication information (account, password). It should be noted that the server address (URL) 2016 is included in "registration device identification information" described in the appended claims.

The FW area stores the firmware containing a control procedure of the controller 205. The FW area may be a ROM memory or may be a RAM memory. However, the FW region is preferably a RAM memory in order to implement the later-described function of updating the firmware, and thus the FW region is described as a RAM memory in the embodiment.

Returning to FIG. 3, the communication unit 207 is a processing unit which communicates with the server device 31 via a general-purpose network such as the Internet or a mobile telephone network, and is used when a predetermined data is transmitted or received, or the application software 2014 is downloaded.

Next, the operation of the relay device 20 is described.

FIG. 5 is a flowchart illustrating an example of the operation of the relay device 20 in Embodiment 1 of the present invention.

As illustrated in FIG. 5, first, the NFC unit 204 performs Near Field Communication with the terminal device 10 via the loop antenna 201, and receives the information from the terminal device 10 (S102).

In the case where the corresponding software which corresponds to the application identification information 1003 contained in the information received by the NFC unit 204 is stored in the memory 206, the controller 205 acquires the corresponding software from the memory 206, and causes the software to run (S104).

Here, the relationship between the operations of the terminal device 10, the relay device 20, and the server device 31 is described in more detail.

FIG. 6A is a sequence diagram illustrating an example of the operation of the terminal device 10, the relay device 20, and the server device 31 in Embodiment 1 of the present invention. Specifically, FIG. 6A is a sequence diagram illustrating an example of the operation of the terminal device 10, the relay device 20, and the server device 31 in a configuration where the terminal device 10 has an installed IC tag function, and the relay device 20 has a reader/writer function.

As illustrated in FIG. 6A, first, the NFC unit 204 of the relay device 20 transmits a polling signal to the terminal device 10 via the loop antenna 201 (S201). The relay device 20 may transmit a polling signal with a constant time interval, or may transmit a polling signal when no polling signal is received from the terminal device 10, or may transmit a polling signal in accordance with an operation by a user. In the case where the relay device 20 is serving the IC tag function, the relay device 20 switches from the IC tag function to the reader/writer function, or a polling signal may be transmitted upon switching to the reader/writer function by a user settings.

The NFC unit 103 of the terminal device 10 then receives the polling signal from the relay device 20 (S203), and transmits a polling response to the relay device 20 (S205). The NFC unit 204 of relay device 20 then receives the polling response from the terminal device 10 (S207), and establishes Near Field Communication with the terminal device 10.

In the case where Near Field Communication is established between the relay device 20 and the terminal device 10 by the relay device 20 transmitting a polling signal to the terminal device 10 in this manner, the relay device 20 serves as a device having the reader/writer function, and the terminal device 10 serves as a tag device having the IC tag function. That is to say, in this case, the relay device 20 determines that the terminal device 10 is a tag device, and thus serves as a reader/writer device.

When Near Field Communication is established, the NFC unit 204 of the relay device 20 requests the terminal device 10 to transmit information that contains at least the terminal device specific information 1001, the server access information 1002, and the application identification information 1003 (S209).

Accordingly, the NFC unit 103 of the terminal device 10 transmits the information to the relay device 20 via the loop antenna 104 (S210), and the NFC unit 204 of the relay device 20 receives the information from the terminal device 10 via the loop antenna 201 (S212). Thus, when the terminal device 10 is a tag device, by making the relay device 20 serve as a reader/writer device, Near Field Communication between the terminal device 10 and the relay device 20 can be established, and thus the relay device 20 can receive the information.

The controller 205 of the relay device 20 then stores the information received by the which NFC unit 204 into the memory 206 (S214). Here, the controller 205 temporarily stores the terminal device specific information 1001 and the application identification information 1003 into the memory 206 while writing the server access information 1002 to the server access information 2015 of the memory 206.

The controller 205 acquires the application corresponding to the application identification information 1003 from the application software 2014 stored in the memory 206, and causes the acquired application to run (S216). Here, the application caused to run is the application for performing regular user registration of the terminal device 10. In the embodiment, it is assumed that the application corresponding to the application identification information 1003 is contained in the application software 2014.

Next, in accordance with the operation of the application caused to run, the controller 205 generates, as communication information, at least one of the relay device identification information 2011 stored in the memory 206, the user identification information 2012 and the relay device model number 2013, and information containing at least the terminal device specific information 1001 (S218).

In accordance with the operation of the application, the communication unit 207 of the relay device 20 refers to the server address (URL) 2016 of the server access information 2015, and connects to the server device 31 indicated by the server address (URL) 2016 to transmit the communication information (S220).

The server device 31 which has received the communication information registers the terminal device specific information 1001 to a database with the terminal device specific information 1001 associated with the relay device identification information 2011, the user identification information 2012, and/or the relay device model number 2013 that are contained in the communication information (S222). In this manner, regular user registration of the terminal device 10 can be performed.

The server device 31 then transmits a notice of completion of registration to the relay device 20 (S224), and the relay device 20 which has received the notice displays the completion of registration on the display unit 202 (S226), and terminates the processing.

[Modification of Embodiment 1]

Next, a modification of Embodiment 1 is described. The above-described Embodiment 1 is assumed to have a configuration such that the terminal device 10 has the installed IC tag function, and the relay device 20 has the reader/writer function in FIG. 6A. However, the modification is assumed to have a configuration such that the terminal device 10 has the installed reader/writer function, and the relay device 20 has the IC tag function.

Figure 6B:
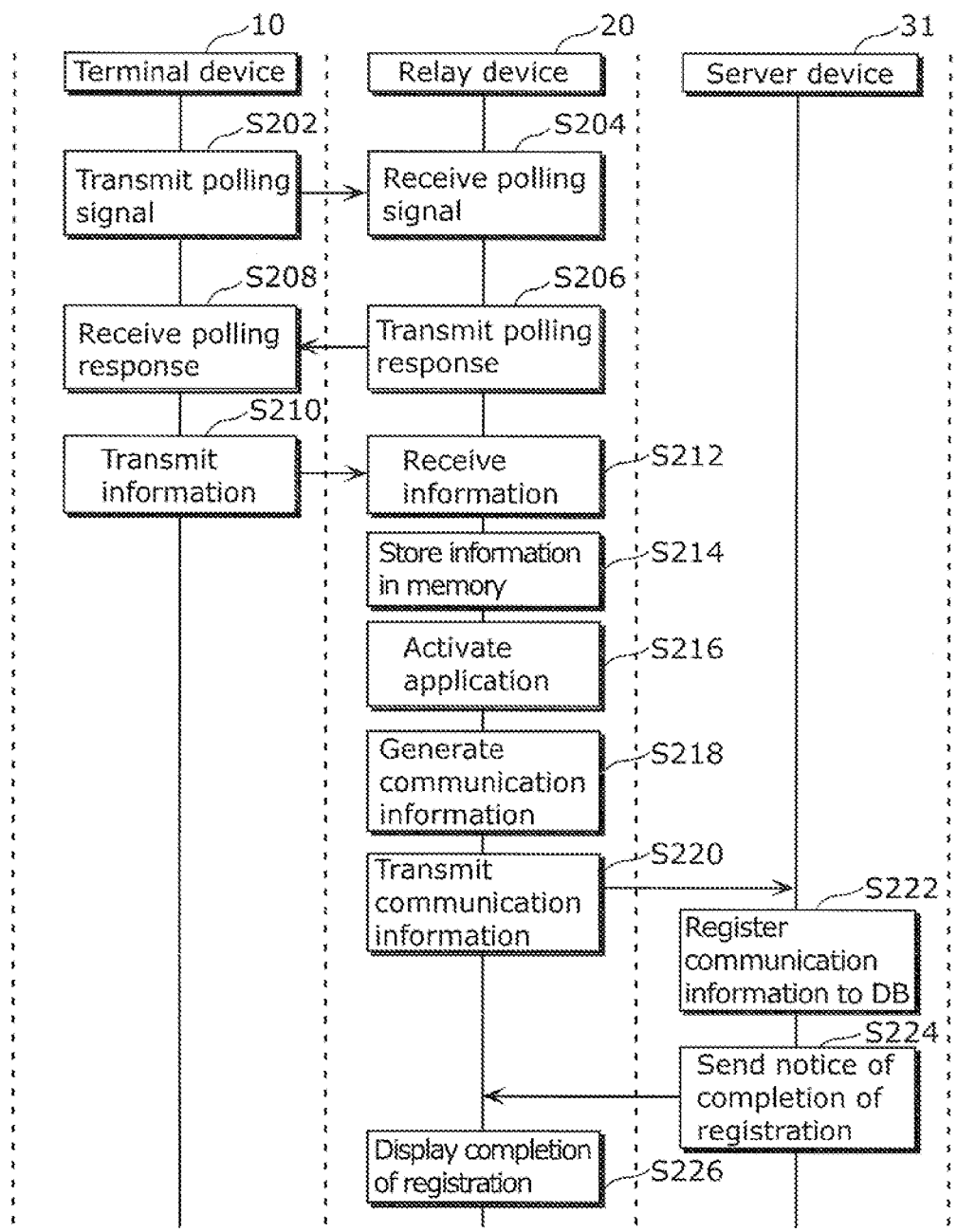
FIG. 6B is a sequence diagram illustrating an example of the operation of the terminal device, the relay device, and a server device in a modification of Embodiment 1 of the present invention.

FIG. 6B is a sequence diagram illustrating an example of the operation of the terminal device 10, the relay device 20, and the server device 31 in the modification of Embodiment 1. Specifically, FIG. 6A is a sequence diagram illustrating an example of the operation of the terminal device 10, the relay device 20, and the server device 31 in a configuration where the terminal device 10 has an installed reader/writer function, and the relay device 20 has an IC tag function.

As illustrated in FIG. 6A, first, the NFC unit 103 of the terminal device 10 transmits a polling signal to the relay device 20 via the loop antenna 104 (S202). The terminal device 10 may transmit a polling signal with a constant time interval, or may transmit a polling signal when no polling signal is received from the relay device 20, or may transmit a polling signal in accordance with an operation by a user. In the case where the terminal device 10 is serving the IC tag function, the terminal device 10 switches from the IC tag function to the reader/writer function, or a polling signal may be transmitted upon switching to the reader/writer function by a user settings.

The NFC unit 204 of the relay device 20 then receives a polling signal from the terminal device 10 (S204), and transmits a polling response to the terminal device 10 (S206). The NFC unit 103 of the terminal device 10 then receives a polling response from the relay device 20 (S208), and establishes Near Field Communication with the relay device 20.

In the case where Near Field Communication is established between the terminal device 10 and the relay device 20 by the terminal device 10 transmitting a polling signal to the relay device 20 in this manner, the terminal device 10 serves as a device having the reader/writer function, and the relay device 20 serves as a tag device having the IC tag function. That is to say, in this case, the relay device 20 determines that the terminal device 10 is a reader/writer device, and thus serves as a tag device.

When Near Field Communication is established, the NFC unit 103 of the terminal device 10 transmits information to the relay device 20 via the loop antenna 104, the information containing at least the terminal device specific information 1001, the server access information 1002, and the application identification information 1003 (S210). The NFC unit 204 of the relay device 20 receives the information from the terminal device 10 via the loop antenna 201 (S212). Thus, when the terminal device 10 is a reader/writer device, by making the relay device 20 serve as a tag device, Near Field Communication between the terminal device 10 and the relay device 20 can be established, and thus the relay device 20 can receive the information.

Subsequent processing (S214 to S226) are then performed, however, these processing are the same as those (S214 to S226 of FIG. 6A) illustrated in FIG. 6A, and thus detailed description is omitted.

Because the relay device 20 switches from a tag device to a reader/writer device during the processing (S214 to S226), the terminal device 10 does not need to continue to transmit a polling signal, and thus power consumption can be reduced. For example, the relay device 20, when causing the application to run (S216), switches from a tag device to a reader/writer device.

With the above configuration, the embodiment effectively operates in the following situations.

For example, a user places the loop antenna 201 of the relay device 20 near the loop antenna 104 of the terminal device 10 to establish Near Field Communication between the terminal device 10 and the relay device 20, the terminal device 10 transmits the terminal device specific information 1001, the server access information 1002, and the application identification information 1003 that are stored in the memory 102 to the relay device 20.

Accordingly, even when the application stored in the relay-device 20 is not previously caused to run, a predetermined application is caused to run based on the application identification information 1003, desired information such as the terminal device specific information 1001, the relay device identification information 2011, the user identification information 2012, and the relay device model number 2013 can be transmitted to the server device 31 at the place stated in the server access information 1002. That is to say, the user can register the information of the terminal device 10 to the server device 31 without causing application to run with the relay device 20.

That is to say, according to the relay device 20 of the present embodiment and its modification, the application identification information 1003 which identifies the application for processing information is received via Near Field Communication, and the application corresponding to the application identification information 1003 is acquired and caused to run. That is to say, only by establishing Near Field Communication between the terminal device 10 and the relay device 20, the application for processing the received information can be caused to run. Accordingly, the information received from the terminal device 10 via Near Field Communication can be processed without a complicated operation by a user. Because the application does not need to be kept on in the relay device 20, power consumption can be reduced.

In the case where the application corresponding to the application identification information 1003 is stored in the memory 206, the application is acquired from the memory 206 and is caused to run. That is to say, only by establishing Near Field Communication between the terminal device 10 and the relay device 20, the application stored in the memory 206 is automatically caused to run to process the received information. Accordingly, the information received from terminal device 10 via Near Field Communication can be processed, without a complicated operation by a user.

In addition, only by establishing Near Field Communication between the terminal device 10 and the relay device 20, the information containing at least the identification information of the terminal device 10 is transmitted to the server device 31 with the information associated with the identification information of the relay device 20. Accordingly, with a single touch operation by a user, the information received from the communication terminal device 10 via Near Field Communication can be processed, and the information of the communication terminal device 10 can be registered to the external server device 31.

In the present embodiment and its modification, when the loop antenna 201 of the relay device 20 is placed near the loop antenna 104 of the terminal device 10, the terminal device specific information 1001, the server access information 1002, and the application identification information 1003 are transmitted to the relay device 20 by the terminal device 10, however, only the application identification information 1003 may be transmitted to the relay device 20.

In this case, the controller 101 switches the mode of the NFC unit 103 to an IC tag mode, the controller 205 of the relay device 20 causes a predetermined application to run, then the controller 101 switches the mode of the NFC unit 204 to a reader/writer mode, and subsequently, in accordance with the operation of the application, the relay device 20 can read the terminal device specific information 1001 and the server access information 1002. Accordingly, the amount of information exchanged between the terminal device 10 and the relay device 20 at a time can be reduced.

In the modification of the present embodiment, the terminal device 10 may be provided with a button for activating the NFC unit 103 and starting a polling operation for performing Near Field Communication with relay device 20. Normally, a polling operation involves continuous transmission of radio waves to unspecified partners, a load is imposed on a battery-operated mobile device from a viewpoint of battery life. Consequently, with an arrangement of a dedicated button for starting the polling operation, a user can stop useless polling operation.

[Embodiment 2]

Next, Embodiment 2 in the present invention is described in detail with reference to the drawings. In the above-described Embodiment 1, the application corresponding to the application identification information 1003 is pre-installed in the relay device 20, and the application is caused to run automatically. However, in the present Embodiment 2, even when the application is not pre-installed, the application is received from the server device 31 and is caused to run.

Here, the communication system in Embodiment 2 is provided with a mobile device 5000 instead of the relay device 20 of the communication system 1 illustrated in FIG. 1 in Embodiment 1. Thus, hereinafter, the configuration of the mobile device 5000 is described in detail.

Figure 7:
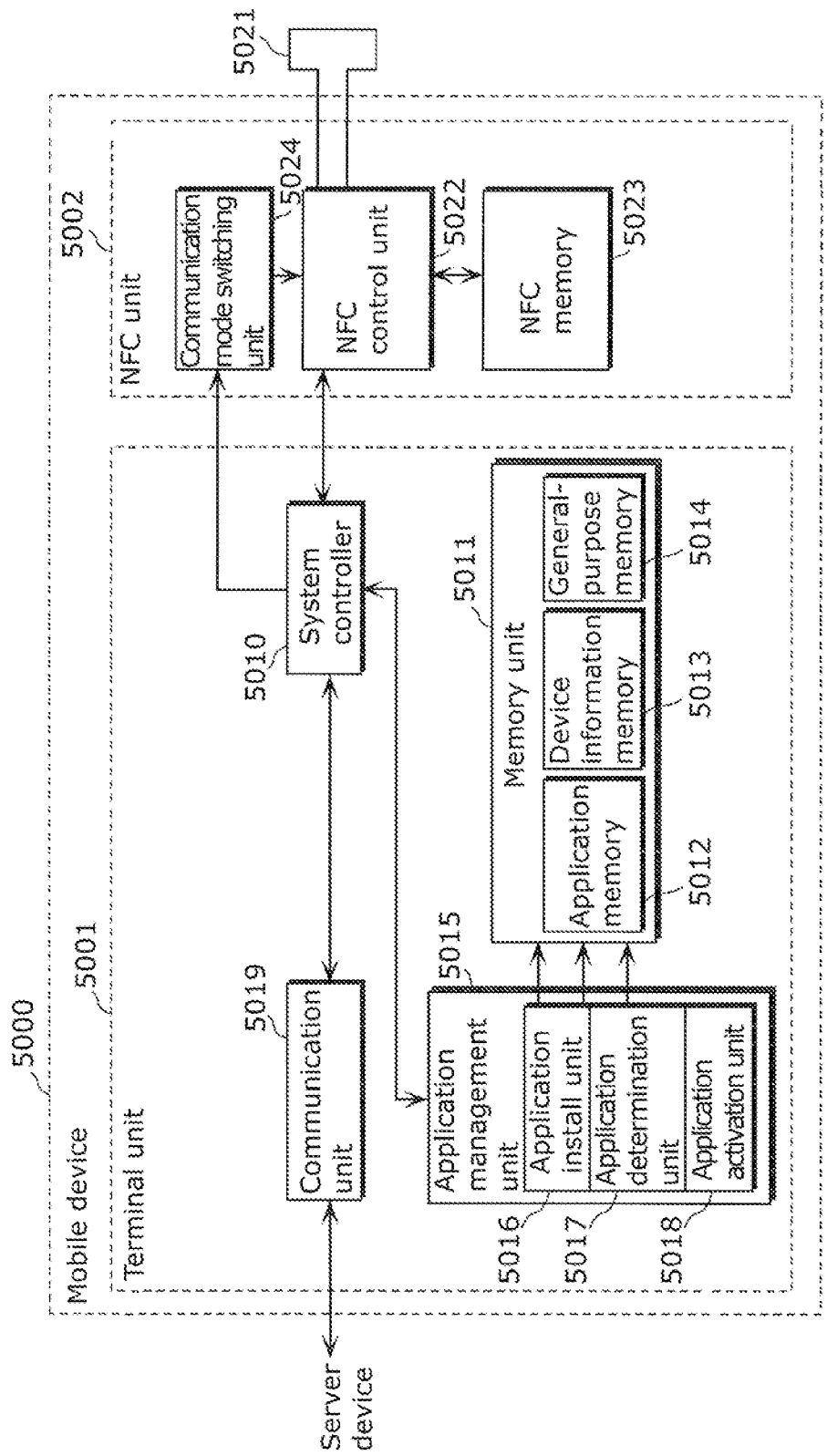
FIG. 7 is a block diagram illustrating the configuration of a mobile device as a relay device in Embodiment 2 of the present invention.

FIG. 7 is a block diagram illustrating the configuration of the mobile device 5000 as a relay device in Embodiment 2.

As indicated in FIG. 7, the mobile device 5000 includes a terminal unit 5001 and a NFC unit 5002, and the terminal unit 5001 and the NFC unit 5002 are connected to each other by a system controller 5010 of the terminal unit 5001. The mobile device 5000 corresponds to "communication device" described in the appended claims, and is, for example, a mobile terminal such as a smart phone.

The terminal unit 5001 is connected to the server device 31 via the Internet or a mobile network, and is connected to the NFC unit 5002 via serial interface or an internal bus.

The terminal unit 5001 includes the system controller 5010, a memory unit 5011, an application management unit 5015, and a communication unit 5019. The system controller 5010 and the application management unit 5015 are included in the "control unit" described in the appended claims.

The system controller 5010 is a system controller of the terminal unit 5001, and is connected to the NFC unit 5002 and controls each component of the terminal unit 5001. The control performed by the system controller 5010 is described in detail later.

The memory unit 5011 is a memory including an application memory 5012, a device information memory 5013, and a general-purpose memory 5014. The memory unit 5011 corresponds to the "storage unit" described in the appended claims.

The application memory 5012 is a memory to store the application installed in terminal unit 5001, and is configured of a non-volatile memory.

The device information memory 5013 is a memory to store the later-described device information of terminal unit 5001. Although the detail of device information is described late, the device information includes the terminal identification information, the telephone number, the mail address, and the contractor ID of the mobile device 5000.

The general-purpose memory 5014 includes a memory which temporarily stores terminal communication information received via Near Field Communication, and information received in the communication unit 5019 from the server device 31.

The application management unit 5015 is a processing unit which manages the application installed in the terminal unit 5001, and includes an application installation unit 5016, an application determination unit 5017, and an application running unit 5018.

The application determination unit 5017 determines whether or not the application corresponding to the application identification information is stored in the application memory 5012 of the terminal unit 5001, based on the application identification information contained in the terminal communication information received via the NFC unit 5002. Here, the application identification information is identification information which identifies the software to process the information received from the terminal device 10.

When the application determination unit 5017 determines that the application corresponding to the application identification information is not stored in the memory 5012, the application installation unit 5016 is connected to the server device 31 in which the application is stored, based on the application download URL indicated by the terminal communication information received by the NFC unit 5002.

Here, in addition to the database for information registration, the server device 31 stores software (application). That is to say, the server device 31 includes the function of the "storage device" and the "registration device" described in the appended claims. The communication system 1 may include two server devices: a server device which stores software (corresponding to "storage device" described in the appended claims), and a server device for registering information (corresponding to "registration device" described in the appended claims).

The application installation unit 5016 then transmits a software transmission request signal for requesting transmission of the application to the connected server device 31 via the communication unit 5019, and acquires the application from the server device 31. The application installation unit 5016 then downloads the application and installs the application to the application memory 5012. The software transmission request signal contains application identification information and identification information which identifies the mobile device 5000.

The application running unit 5018 causes the application to run that is stored in the application memory 5012 of the terminal unit 5001 based on the application identification information contained in the terminal communication information received via the NFC unit 5002. The application running unit 5018 performs its operation only when the application determination unit 5017 determines that the application corresponding to the received application identification information is installed in the application memory 5012.

Specifically, the application running unit 5018 acquires the application from the application memory 5012 to cause the application to run when the application determination unit 5017 determines that the application corresponding to the application identification information is stored in the application memory 5012.

When the application determination unit 5017 determines that the application corresponding to the application identification information is not stored in the application memory 5012, the application running unit 5018 acquires and causes the application to run that is downloaded from the server device 31 and installed to the application memory 5012 by the application installation unit 5016.

The communication unit 5019 is a processing unit which connects to the server device 31 with an indicated URL, and receives information from the server device 31 and/or transmits information to the server device 31, in accordance with the URL of the server device 31 contained in the terminal communication information received by the NFC unit 5002. The communication unit 5019 has the two operation modes mentioned below.

The first mode is the installation mode of application.

In this mode, when the application determination unit 5017 determines that the application is not installed to the application memory 5012, the communication unit 5019 indicated by the application identification information contained in the terminal communication information received by the NFC unit 5002 connects to the server device 31 which is indicated by the application download URL contained in the terminal communication information. The communication unit 5019 then downloads the application indicated by the application identification information from the server device 31, and transmits the application to the application installation unit 5016.

The application installation unit 5016, when receiving the downloaded application, installs the application to the application memory 5012.

The second mode of the communication unit 5019 is the register mode to the server device 31.

In this mode, after the application running unit 5018 causes the application to run that is indicated by the application identification information, the communication unit 5019 connects to the server device 31 based on registration data base URL indicated by the access information of the terminal communication information which is received by the NFC unit 5002 and stored in the general-purpose memory 5014. The communication unit 5019 then generates and transmits the mobile communication information to the server device 31, the mobile communication information including terminal information which identifies the terminal device 10 contained in the terminal communication information, and the communication device information stored in the device information memory 5013, associated with the terminal information.

Next, the NFC unit 5002 of the mobile device 5000 is described. The NFC unit 5002 is a unit to perform Near Field Communication with the terminal device 10, and includes a loop antenna 5021, an NFC control unit 5022, an NFC memory 5023, and a communication mode switching unit 5024.

The NFC unit 5002 is a communication unit using general NFC (Near Field Communication), and is a processing unit to make communication within a distance of several tens cm in the 13.56 MHz band.

The NFC has IC card emulation mode in which IC card is emulated, and reader/writer emulation mode in which reader/writer of the IC card is emulated.

The large difference between the IC card emulation mode and the reader/writer emulation mode is whether or not a calling operation known as polling is performed. The polling involves continuous transmission of radio waves in order to call unspecified IC cards. On the other hand, in the IC card emulation mode, polling from a reader/writer is received as radio waves, and an operation is performed with the power and clock generated from the received radio waves. Consequently, unlike the reader/writer, radio waves are not outputted continuously.

An NFC module which is built in a general mobile phone also has the IC card emulation mode and the reader/writer emulation mode. However, only in the case of an operation in the reader/writer emulation mode, it is necessary to explicitly switch to the reader/writer emulation mode by causing an application of the mobile phone to run. In the case where no application is caused to run, operation in IC card emulation mode is normal.

The loop antenna 5021 receives a polling signal from an external terminal device 10 having the reader/writer function, and transmits a polling response to the terminal device 10 which is outputting a polling signal, and thus establishes Near Field Communication with the terminal device 10. The loop antenna 5021 corresponds to the "antenna unit" described in the appended claims.

The NFC control unit 5022 demodulates the signal received by the loop antenna 5021, and modulates information to be transmitted to the terminal device 10 via the loop antenna 5021.

The NFC memory 5023 contains a non-volatile memory, and transmits stored content via the loop antenna 5021, or temporarily stores a signal received by the loop antenna 5021, in accordance with a command from an external terminal device 10. In addition, the NFC memory 5023 contains a ROM (Read Only Memory) area in which identification information specific to the NFC unit 5002 is recorded.

The communication mode switching unit 5024 switches the NFC unit 5002 from the IC card emulation mode to the reader/writer emulation mode based on a command from the terminal unit 5001.

That is to say, the communication mode switching unit 5024 switches between the reader/writer emulation mode and the IC card emulation mode, where in the reader/writer emulation mode, the NFC unit 5002 performs Near Field Communication with a reader/writer device having the reader/writer function, while in the IC card emulation mode, the NFC unit 5002 performs Near Field Communication with a tag device having the IC tag function. Specifically, when the terminal device 10 is a reader/writer device, the communication mode switching unit 5024 switches the mode of the NFC unit 5002 to the reader/writer emulation mode, and when the terminal device 10 is a tag device, the communication mode switching unit 5024 switches the mode of the NFC unit 5002 to the IC card emulation mode.

Figure 8:
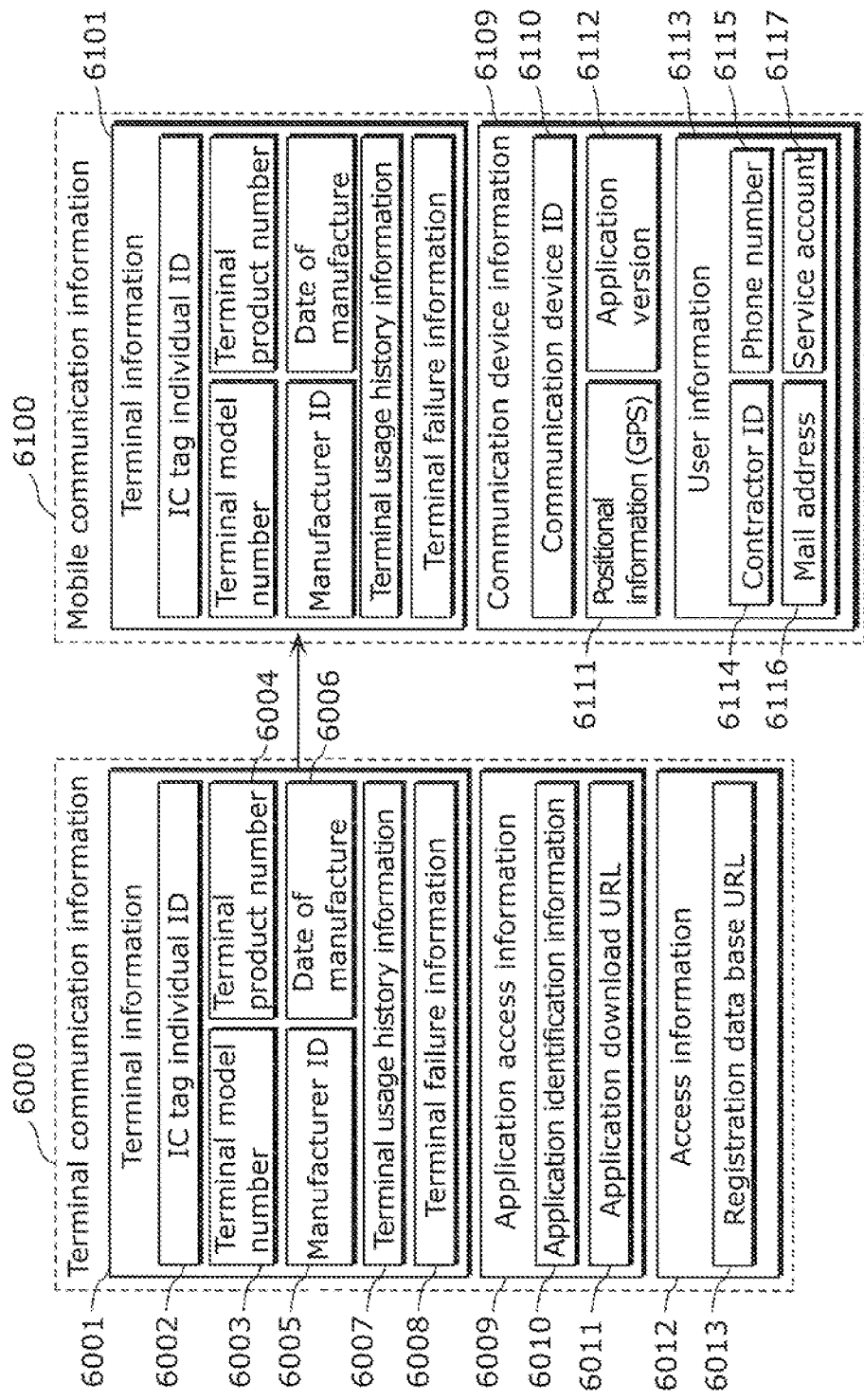
FIG. 8 is a diagram illustrating the configuration of terminal communication information and mobile communication information that are respectively received and transmitted by a mobile device in Embodiment 2 of the present invention.

FIG. 8 is a diagram illustrating the configuration of terminal communication information 6000 and mobile communication information 6100 that are respectively received and transmitted by the mobile device 5000 in Embodiment 2 of the present invention. Specifically, FIG. 8 is a conceptual diagram illustrating the configuration of the terminal communication information 6000 received by the mobile device 5000 from an external terminal device 10 via Near Field Communication, and the mobile communication information 6100 transmitted from the mobile device 5000 to the server device 31 via the communication unit 5019.

As indicated in FIG. 8, the terminal communication information 6000 contains terminal information 6001, application access information 6009, and access information 6012.

The terminal information 6001 contains IC tag individual ID 6002 specific to the NFC unit 103 of the terminal device 10, a terminal model number 6003 which allows the type of the terminal device 10 to be identified, a terminal product number 6004 which allows the body of the terminal device 10 to be identified, a manufacturer ID 6005 which allows the manufacturer of the terminal device 10 to be identified, a date of manufacture 6006 of the terminal device 10, a terminal usage history information 6007 indicating usage history information related to usage of the terminal device 10 by users, and a terminal failure information 6008 for identifying a failure occurred in the terminal device. The information contained in the terminal information 6001 and the terminal information 6001 corresponds to the "terminal identification information" described in the appended claims.

The application access information 6009 contains application identification information 6010 of the application to be installed to the mobile device 5000, and an application download URL 6011 which indicates the server device 31 for application download. The application identification information 6010 is included in the "software identification information" described in the appended claims. The application download URL 6011 is included the "storage device identification information" described in the appended claims.

The access information 6012 contains a registration data base URL 6013 which indicates the server address for registering the terminal information 6001 and the like to the server device 31 via the mobile device 5000. The registered data base URL 6013 is included in the "registration device identification information" described in the appended claims.

On the other hand, the mobile communication information 6100 is the information transmitted from the mobile device 5000 to the server device 31 connected to the mobile device 5000 via the Internet or a mobile network, and contains terminal information 6101 and communication device information 6109.

The terminal information 6101 is the information equivalent to the terminal information 6001 of the terminal communication information 6000, and is used after being retrieved from the general-purpose memory 5014 which temporarily stores the terminal communication information 6000 received via Near Field Communication.

The communication device information 6109 is the information previously stored in the device information memory 5013, and contains a communication device ID 6110 which is identification information specific to the mobile device 5000, a positional information 6111 received by a GPS (Global Positioning System) which is not shown, an application version 6112 as version information of the installed application, and user information 6113. The information contained in the communication device information 6109 and the communication device information 6109 corresponds to the "communication device identification information" described in the appended claims.

The user information 6113 contains a contractor ID 6114 recorded on a SIM card of the mobile device 5000 as identification information of a user of the mobile device 5000, a telephone number 6115 of the mobile device 5000, a mail address 6116 of the mobile device, and a service account 6117 which identifies a user with the server of the registration data base.

Next, a typical operation of the mobile device 5000 is described.

Figure 9:
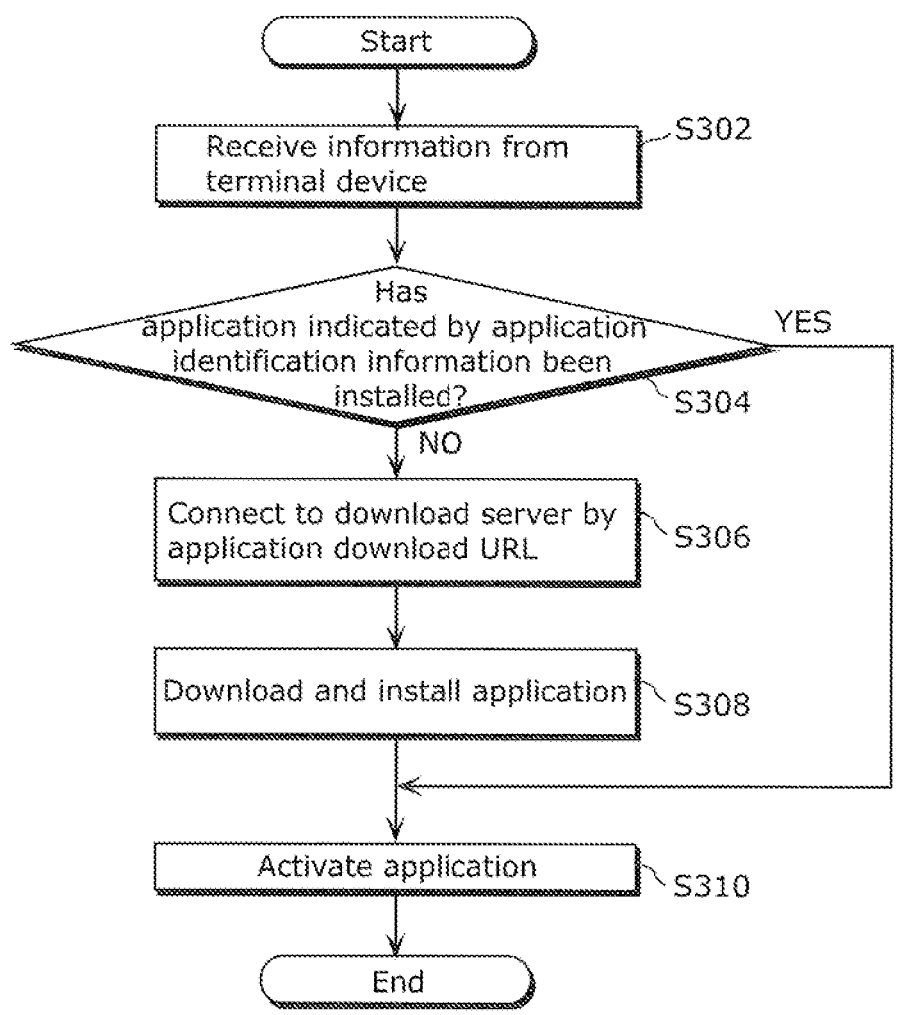
FIG. 9 is a flowchart illustrating an example of the operation of the mobile device in Embodiment 2 of the present invention.

FIG. 9 is a flowchart illustrating an example of the operation of the mobile device 5000 in Embodiment 2.

As indicated in FIG. 9, first, the NFC unit 5002 performs Near Field Communication with the terminal device 10 via the loop antenna 5021, and receives the terminal communication information 6000 from the terminal device 10 (S302).

Specifically, the NFC unit 5002 receives a polling signal from an external terminal device 10 having the reader/writer function, and transmits a polling response to the terminal device 10 which has output a polling signal, and thus establishes Near Field Communication with the terminal device 10. Once Near Field Communication is established, the NFC unit 5002 receives the terminal communication information 6000 from the terminal device 10, and temporarily stores the received terminal communication information 6000 in the NFC memory 5023.

Subsequently, when temporarily storing of the memory of terminal communication information 6000 is completed, the system controller 5010 of the terminal unit 5001 stores the terminal communication information 6000 stored in the NFC memory 5023 into the general-purpose memory 5014 of the memory unit 5011.

Next, the system controller 5010 reads the application identification information 6010 indicated in the application access information 6009 of the terminal communication information 6000 commands the application determination unit 5017 to determine whether or not the application indicated by the application identification information 6010 is already installed in the memory 5012 (S304).

When a result of the determination by the application determination unit 5017 is that the application is already installed (YES at S304), the system controller 5010 commands the application running unit 5018 to retrieve the application indicated by the application identification information 6010 from the memory 5012 and causes the application to run (S310).

On the other hand, when a result of the determination by the application determination unit 5017 is that the application is not installed (NO at S304), the system controller 5010 commands the communication unit 5019 to connect to the server device 31 indicated by the application download URL 6011 of the application access information 6009 of the terminal communication information 6000 (S306).

The system controller 5010 then downloads via the communication unit 5019 the application indicated by the application identification information 6010 of the application access information 6009, and installs the application to the application memory 5012 (S308).

When the installation is completed, the system controller 5010 commands the application running unit 5018 to retrieve the application indicated by the application identification information 6010 from the application memory 5012, and causes the application to run (S310).

When the application is caused to run, the registration data base URL 6013 is read from the access information 6012 of the terminal communication information 6000 stored in the general-purpose memory 5014 as the application operation, and the mobile device 5000 is connected to the server device 31 indicated by the registration data base URL 6013 via the communication unit 5019. The mobile communication information 6100 then is generated, that contains the terminal information 6001 of the terminal communication information 6000, and the communication device information 6109 stored in the device information memory 5013 as the application operation, associated with the terminal information 6001, and the mobile communication information 6100 is transmitted to the server device 31.

Next, the relationship between the operations of the terminal device 10, the mobile device 5000, and the server device 31 is described in more detail.

Figure 10A:
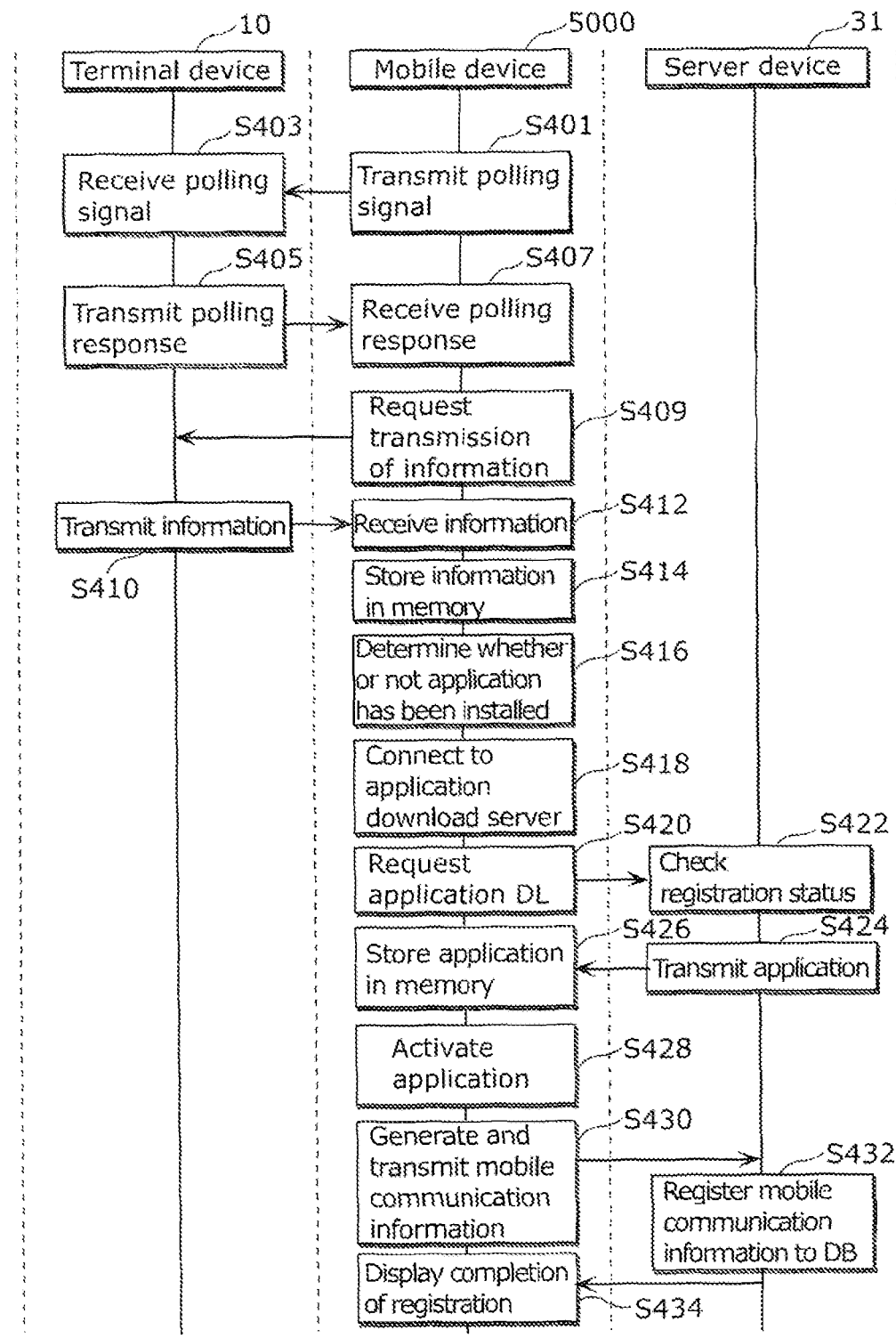
FIG. 10A is a sequence diagram illustrating an example of the operation of a terminal device, the mobile device, and a server device in Embodiment 2 of the present invention.

FIG. 10A is a sequence diagram illustrating an example of the operation of the terminal device 10, the mobile device 5000, and the server device 31 in Embodiment 2. Specifically, FIG. 10A is a sequence diagram illustrating an example of the operation of the terminal device 10, the mobile device 5000, and the server device 31 in a configuration where the terminal device 10 has an installed IC tag function, and the relay device 20 has a reader/writer function.

As illustrated in FIG. 10A, first, the NFC unit 5002 of the mobile device 5000 transmits a polling signal to the terminal device 10 via the loop antenna 5021 (S401). The mobile device 5000 may transmit a polling signal with a constant time interval, or may transmit a polling signal when no polling signal is received from the terminal device 10, or may transmit a polling signal in accordance with an operation by a user. In the case where the mobile device 5000 is serving the IC tag function, the mobile device 5000 switches from the IC tag function to the reader/writer function, or a polling signal may be transmitted upon switching to the reader/writer function by a user settings.

The NFC unit 103 of the terminal device 10 then receives the polling signal from the mobile device 5000 (S403), and transmits a polling response to the mobile device 5000 (S405). The NFC unit 5002 of mobile device 5000 then receives the polling response from the terminal device 10 (S407), and establishes Near Field Communication with the terminal device 10.

In the case where Near Field Communication is established between the mobile device 5000 and the terminal device 10 by the mobile device 5000 transmitting a polling signal to the terminal device 10 in this manner, the mobile device 5000 serves as a device having the reader/writer function, and the terminal device 10 serves as a tag device having the IC tag function. That is to say, in this case, the mobile device 5000 determines that the terminal device 10 is a tag device, and thus serves as a reader/writer device. Specifically, when the terminal device 10 is a tag device, the communication mode switching unit 5024 of the mobile device 5000 switches the mode of the NFC unit 5002 to the IC card emulation mode.

When Near Field Communication is established, the NFC unit 5002 of the mobile device 5000 requests the terminal device 10 to transmit the terminal communication information 6000 that contains the terminal information 6001, the application access information 6009 and the access information 6012 (S409).

Accordingly, the NFC unit 103 of the terminal device 10 transmits the information to the mobile device 5000 via the loop antenna 104 (S410), and the NFC unit 5002 of the mobile device 5000 receives the information from the terminal device 10 via the loop antenna 201 (S412). Thus, when the terminal device 10 is a tag device, by making the mobile device 5000 serve as a reader/writer device, Near Field Communication between the terminal device 10 and the mobile device 5000 can be established, and thus the mobile device 5000 can receive the information.

The system controller 5010 of the mobile device 5000 then temporarily stores the terminal communication information 6000 received by the NFC unit 5002 into the general-purpose memory 5014 (S414).

Next, the application determination unit 5017 determines whether or not the application indicated by the application identification information 6010 is installed in the application memory 5012, based on the application identification information 6010 of the application access information 6009 of the terminal communication information 6000 stored in the general-purpose memory 5014 (S416).

When the application determination unit 5017 determines that the application indicated by the application identification information 6010 is not installed in the application memory 5012, the application installation unit 5016 connects the mobile device 5000 to the server device 31 for downloading the application based on the application download URL 6011 of the application access information 6009 of the terminal communication information 6000 stored in the general-purpose memory 5014 (S418).

The application installation unit 5016 then transmits a software transmission request signal for requesting transmission of the application to the connected server device 31 via the communication unit 5019 (S420). The software transmission request signal contains application identification information 6000 and identification information such as the communication device ID 6110 which identifies the mobile device 5000.

The server device 31 then checks the registration status of application indicated by the application identification information 6010 contained in the software transmission request signal (S422), and transmits the application to the mobile device 5000 indicated by identification information such as the communication device ID 6110 which identifies the mobile device 5000 (S424).

The server device 31 which has received the mobile communication information 6100 registers terminal information 6101 is to the database, with the terminal information 6101 associated with the communication device information 6109 contained in the mobile communication information 6100 (S432). Because the communication device information 6109 contains user information which identifies each user, regular user registration of the terminal device 10 can be performed by registering the terminal information 6101 associated with the communication device information 6109.

The mobile device 5000 which has receives a registration completion notice from the server device 31 causes a display unit to display the notice and terminates the processing (S434).

Here, in the conventional regular user registration, a user itself needs to directly input on a postcard or a website personal information and/or the manufacturer serial number, the product number for each terminal device purchased by the user. For this reason, the volume of the regular user registration did not grow as expected, and thus the original goal has not been achieved.

However, when the present invention is applied, a user can complete regular user registration at a terminal device with a simple one-touch operation.

Although, a general mobile phone is equipped with a NFC module, a complicated operation is needed for the regular user registration, such as installing an application for the regular user registration, or touching on the screen after causing the application to run.

However, when the present invention is applied, the NFC module of a mobile phone can be used in IC card emulation mode for which execution of application is usually unnecessary. When it is determined that the application to be run is not installed, a download site of the application is obtained from the acquired information via Near Field Communication so that the application can be automatically installed.

Once the installation is completed, the terminal information read acquired via Near Field Communication as the installed application operation is transmitted to regular user registration data base with the terminal information associated with the communication device information of the mobile device containing the user information so that a series of processing from installation of application to regular user registration can be performed with a simple one-touch operation.

[Modification of Embodiment 2]

Next, a modification of Embodiment 2 is described. The above-described Embodiment 2, is assumed to have a configuration such that the terminal device 10 has the installed IC tag function, and the mobile device 5000 has the reader/writer function in FIG. 10A. However, the present modification is assumed to have a configuration such that the terminal device 10 has the installed reader/writer function, and the mobile device 5000 has the IC tag function.

Figure 10B:
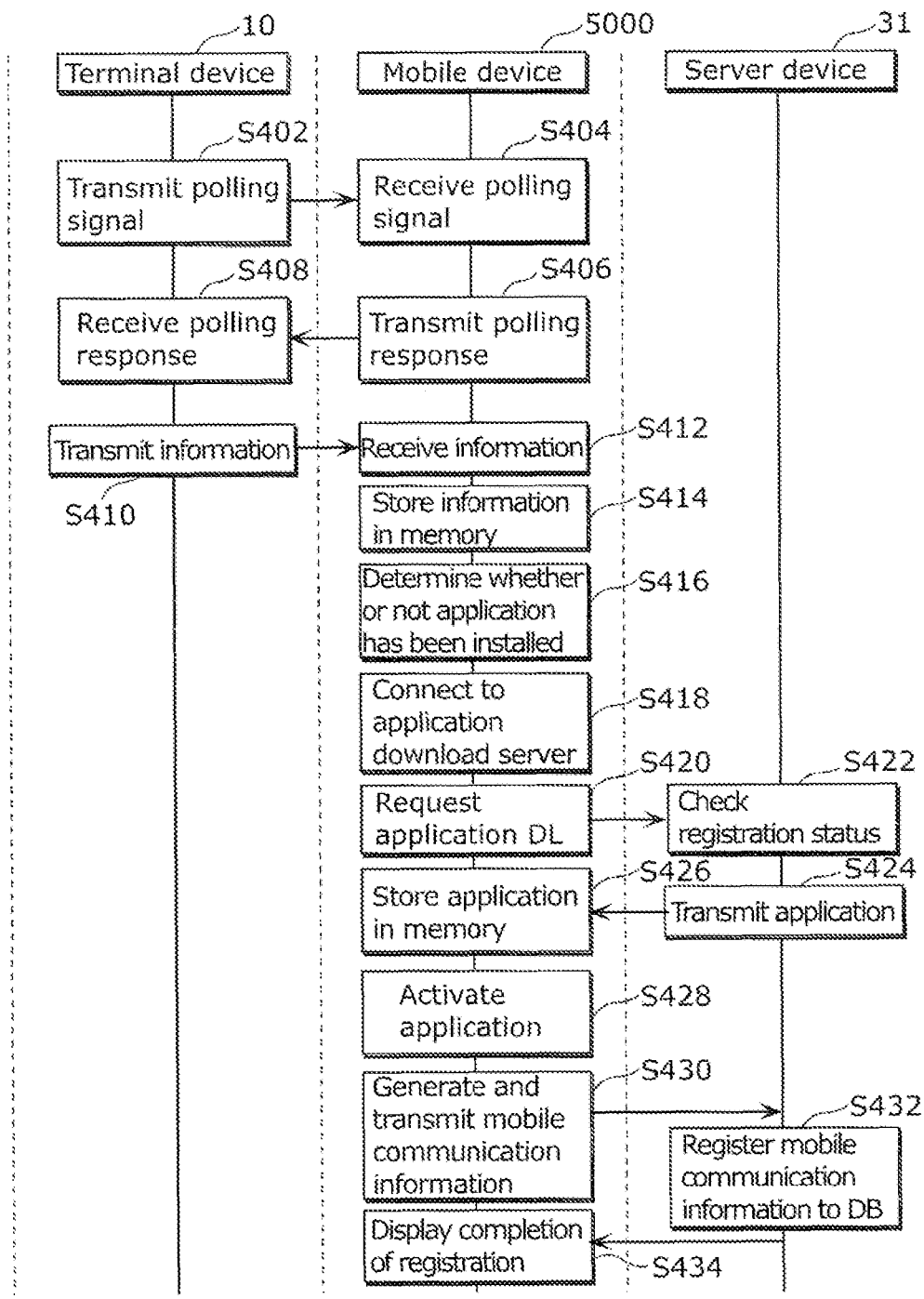
FIG. 10B is a sequence diagram illustrating an example of the operation of a terminal device, the mobile device, and a server device in a modification of Embodiment 2 of the present invention.

FIG. 10B is a sequence diagram illustrating an example of the operation of the terminal device 10, the mobile device 5000, and the server device 31 in the modification of Embodiment 2. Specifically, FIG. 10A is a sequence diagram illustrating an example of the operation of the terminal device 10, the mobile device 5000, and the server device 31 in a configuration where the terminal device 10 has an installed reader/writer function, and the relay device 20 has an IC tag function.

As illustrated in FIG. 6A, first, the NFC unit 103 of the terminal device 10 transmits a polling signal to the mobile device 5000 via the loop antenna 104 (S402). The terminal device 10 may transmit a polling signal with a constant time interval, or may transmit a polling signal when no polling signal is received from the mobile device 5000, or may transmit a polling signal in accordance with an operation by a user. In the case where the terminal device 10 is serving the IC tag function, the terminal device 10 switches from the IC tag function to the reader/writer function, or a polling signal may be transmitted upon switching to the reader/writer function by a user settings.

The NFC unit 5002 of the mobile device 5000, then receives a polling signal from the terminal device 10 (S404), and transmits a polling response to the terminal device 10 (S406). The NFC unit 103 of the terminal device 10 then receives a polling response from the mobile device 5000 (S408), and establishes Near Field Communication with the mobile device 5000.

In the case where Near Field Communication is established between the terminal device 10 and the mobile device 5000 by the terminal device 10 transmitting a polling signal to the mobile device 5000 in this manner, the terminal device 10 serves as a device having the reader/writer function, and the mobile device 5000 serves as a tag device having the IC tag function. That is to say, in this case, the mobile device 5000 determines that the terminal device 10 is a reader/writer device, and thus serves as a tag device. Specifically, when the terminal device 10 is a reader/writer device, the communication mode switching unit 5024 of the mobile device 5000 switches the mode of the NFC unit 5002 to the reader/writer emulation mode.

When Near Field Communication is established, the NFC unit 103 of the terminal device 10 transmits terminal communication information 6000 to the mobile device 5000 via the loop antenna 104, terminal communication information 6000 containing the terminal information 6001, the application access information 6009, and the access information 6012. The NFC unit 5002 of the mobile device 5000 receives the information from the terminal device 10 via the loop antenna 5021 (S412). Thus, when the terminal device 10 is a reader/writer device, by making the mobile device 5000 serve as a tag device, Near Field Communication between the terminal device 10 and the mobile device 5000 can be established, and thus the mobile device 5000 can receive the information.

Subsequent processing (S414 to S434) are then performed, however, these processing are the same as those (S414 to S434 of FIG. 10A) illustrated in FIG. 6A, and thus detailed description is omitted.

Because the mobile device 5000 switches from a tag device to a reader/writer device during the processing (S414 to S434), the terminal device 10 does not need to continue to transmit a polling signal, and thus power consumption can be reduced. For example, in accordance with caused running of application (S428), the mobile device 5000 is switched from the IC card emulation mode to the reader/writer emulation mode. Consequently, the terminal device 10 can be switched from the reader/writer emulation mode to the IC card emulation mode, the polling operation of the terminal device 10 can be explicitly terminated, and thus the power consumption of the terminal device 10 can be reduced. The mobile device 5000 can be switched from the reader/writer emulation mode to the IC card emulation mode in according with termination operation of the application, and thus the polling operation can be terminated.

As described above, according to the mobile device 5000 in Embodiment 2 and in the modification, even when the application corresponding to the application identification information 6010 is not stored in the application memory 5012, the relevant application is acquired from an external server device and is caused to run. That is to say, only by establishing Near Field Communication between the terminal device 10 and the mobile device 5000, even when a predetermined application is not stored in the mobile device 5000, the predetermined application is automatically caused to run without operating the mobile device 5000, and the received information is processed. Accordingly, the information received from terminal device 10 via Near Field Communication can be processed, without a complicated operation by a user. In addition it is not necessary to store a great number of applications in the memory of the mobile device 5000, a large capacity of memory is not necessary, and thus the memory space can be reduced.

The download application URL 6011 is received from the terminal device 10, and the software transmission request signal containing the application identification information 6010 is transmitted to the server device indicated by the application download URL 6011, and thus the application is acquired from the server device and is caused to run. That is to say, a server device can be easily accessed by receiving the access information to the server device from the terminal device 10, and the application can be easily obtained from the server device by transmitting the application identification information 6010 to the server device. Therefore, without performing complicated processing, the information received from the terminal device 10 via Near Field Communication can be processed.

When the terminal device 10 is a reader/writer device, the NFC unit 5002 is switched to the reader/writer mode, and when the terminal device 10 is a tag device, the NFC unit 5002 is switched to the tag mode. That is to say, placing the reader/writer device or a tag device near the mobile device 5000, Near Field Communication is established between the mobile device 5000, and the reader/writer or tag device, and thus a predetermined software can be caused to run automatically. Consequently, regardless of whether the terminal device 10 is a reader/writer device or a tag device, the information received from the terminal device 10 via Near Field Communication can be processed without a complicated operation by a user.

In the above, the relay device 20 and the mobile device 5000 which are the communication devices according to the present invention have been described using the above embodiments and modifications, however, the present invention is not limited to the above embodiments and modifications.

That is to say, it should be understood that the embodiments and modifications disclosed herein are intended for illustrative purposes in all senses and not in a limiting sense. The scope of the present invention is shown by the accompanying claims, and not by of the above description. It is intended that the accompanying claims and all modifications in the sense and range of the equivalents are included in the scope of the present invention.

Figure 11:
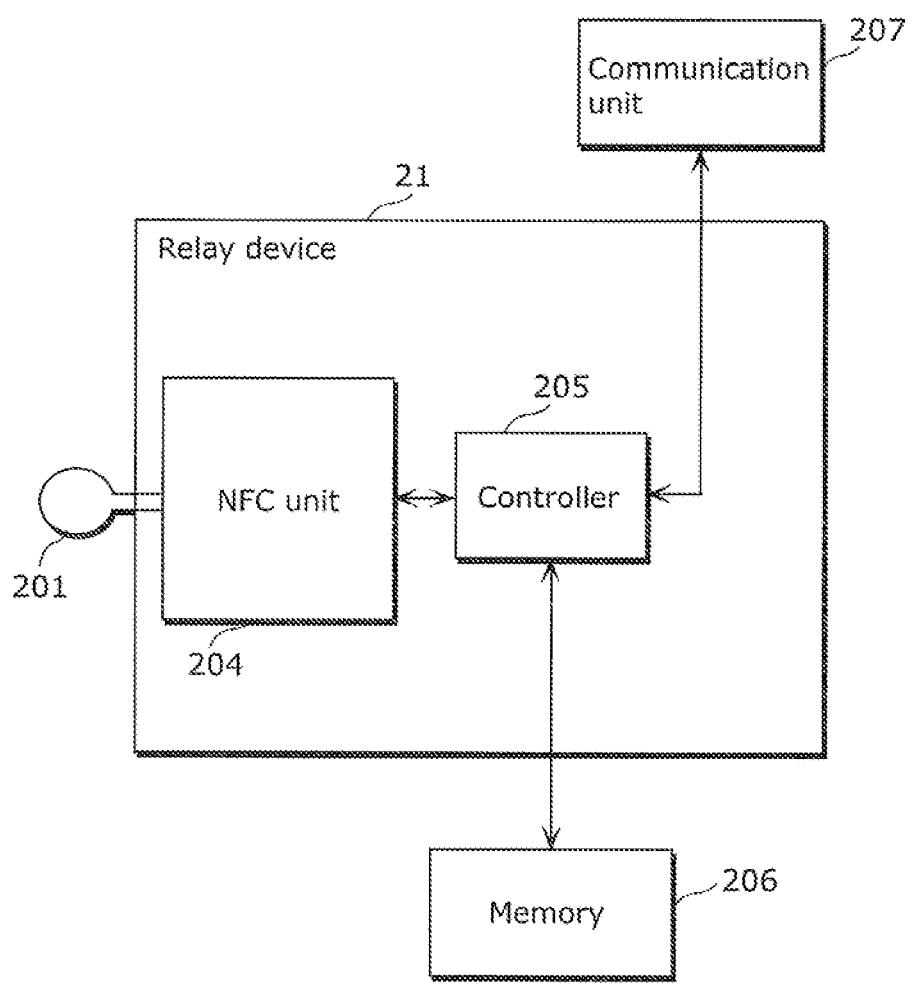
FIG. 11 is a block diagram illustrating the configuration of the relay device in the modification of Embodiment 1 of the present invention.

For example, in the above-described Embodiment 1 and its modification, the relay device 20 includes the loop antenna 201, the NFC unit 204, the controller 205, the memory 206, and the communication unit 207 as indicated in FIG. 3. However, as indicated in FIG. 11, the relay device 21 should include at least the loop antenna 201, the NFC unit 204, and the controller 205, and the memory 206 and the communication unit 207 may be provided outside of the relay device 21. That is to say, the NFC unit 204 performs Near Field Communication with the terminal device 10 via the loop antenna 201, and receives the software identification information from the terminal device 10, the software identification information identifying the software that processes the information received from the terminal device 10, and the controller 2.05 may acquire software corresponding to the software identification information from an external memory 206 or communication unit 207 and may cause the software to run.

The present invention may be achieved not only as such a communication device, but also as an integrated circuit including each processing unit which constitutes the communication device, or as a method including steps which are performed by corresponding processing units which constitute the communication device. The present invention may be achieved as a program which causes a computer to execute these steps, or as a computer readable recording medium such as a CD-ROM, on which the program is recorded, or as information, data, or a signal which indicates the program. The program, information, data, and signal may be distributed via a communication network such as the Internet.

The communication device according to the present invention has a Near Field Communication function, and, for example, usage history information which records the events resulting in a failure can be automatically acquired via Near Field Communication, and thus is useful as a system which find the causes of a failure, thereby preventing the same failure from occurring again.

REFERENCE SIGNS LIST

1 Communication system
10 Terminal device
20, 21 Relay device
30 Network
31 Server device
101 Controller
102 Memory
103 NFC unit
104 Loop antenna
201 Loop antenna
202 Display unit
203 Input unit
204 NFC unit
205 Controller
206 Memory
207 Communication unit
1001 Terminal device specific information
1002 Server access information
1003 Application identification Information
2011 Relay device identification information (manufacturer serial number)
2012 User identification information (such as SIM card ID)
2013 Relay device model number (manufacturer product number)
2014 Application software
2015 Server access information
2016 Server address (URL)
5000 Mobile device
5001 Terminal unit
5002 NFC unit
5010 System controller
5011 Memory unit
5012 Application memory
5013 Device information memory
5014 General-purpose memory
5015 Application management unit
5016 Application installation unit
5017 Application determination unit
5018 Application running unit
5019 Communication unit
5021 Loop antenna
5022 NFC control unit
5023 NFC memory
5024 Communication mode switching unit
6000 Terminal communication information
6001 Terminal information
6002 IC tag individual ID
6003 Terminal model number
6004 Terminal product number
6005 Manufacturer ID
6006 Date of manufacture
6007 Terminal usage history information
6008 Terminal failure information
6009 Application access information
6010 Application identification information
6011 Application download URL
6012 Access information
6013 Registration data base URL
6100 Mobile communication information
6101 Terminal information
6109 Communication device information
6110 Communication device ID
6111 Location information (GPS)
6112 Application version
6113 User information
6114 Contractor ID
6115 Telephone number
6116 Mail address
6117 Service account

The invention claimed is:

1. A communication device which performs Near Field Communication (NFC) with a communication terminal device, processes, by software, information received from the communication terminal device, and transmits the information to a registration device connected via a communication network, the communication device comprising:

an antenna unit configured to receive radio waves from the communication terminal device;

an NFC unit configured to switch to either one of two communication modes including (i) a first mode in which the communication device acts as a reader/writer device which transmits a polling signal to the communication terminal device and receives a polling response from the communication terminal device, and (ii) a second mode in which the communication device acts as a tag device which receives a polling signal from the communication terminal device and transmits a polling response to the communication terminal device, and to perform Near Field Communication with the communication terminal device via the antenna unit so as to receive software identification information and terminal identification information from the communication terminal device, the software identification information identifying an item of software that processes the information received from the communication terminal device, and the terminal identification information identifying the communication terminal device;

a control unit configured to acquire corresponding software which is an item of software corresponding to the received software identification information, and to cause the acquired corresponding software to run so as to generate registration information containing the received terminal identification information of the communication terminal device, in accordance with an operation of the corresponding software caused to run, and to transmit the registration information to the registration device connected to the communication device via the communication network; and a storage unit configured to store at least one item of software, wherein the NFC unit switches the communication mode to the first mode in the case where the control unit causes the corresponding software to run, in the case where the corresponding software is stored in the storage unit, the control unit is configured to acquire the corresponding software from the storage unit and cause the acquired corresponding software to run, the communication device is connected via a communication network to a storage device which stores at least one item of software containing the corresponding software, the NFC unit switches the communication mode to the second mode in the case where the NFC unit has received the polling signal from the communication terminal device, and the communication device further comprises:

a communication unit configured to communicate with the storage device, the control unit is configured to determine whether or not the corresponding software is stored in the storage unit, based on the software identification information, when it is determined that the corresponding software is stored in the storage unit, the control unit is configured to acquire the corresponding software from the storage unit and cause the acquired corresponding software to run, and when it is determined that the corresponding software is not stored in the storage unit, the control unit is configured to transmit a software transmission request signal to the storage device via the communication unit so as to acquire the corresponding software from the storage device and cause the acquired corresponding software to run, the software transmission request signal requesting transmission of the corresponding application.

2. The communication device according to claim 1, wherein the NFC unit is configured to further receive storage device identification information which identifies the storage device, from the communication terminal device, and in the case where the control unit determines that the corresponding software is not stored in the storage unit, the control unit is configured to transmit the software transmission request signal via the communication unit to a storage device indicated by the received storage device identification information so as to acquire the corresponding software from the storage device and to cause the acquired corresponding software to run, the software transmission request signal containing the software identification information and communication device identification information which identifies the communication device.

3. The communication device according to claim 1, wherein the NFC unit is configured to further receive registration device identification information which identifies the registration device, from the communication terminal device, and the control unit transmits the received terminal identification information to the registration device indicated by the registration device identification information, in accordance with an operation of the corresponding software caused to run, the received terminal identification information being associated with the communication device identification information which identifies the communication device.

4. The communication device according to claim 1, wherein in the case where the NFC unit transmits a polling signal to the communication terminal device, and receives a polling response from the communication terminal device so that Near Field Communication is established, the NFC unit is configured to request the communication terminal device to transmit the software identification information so as to receive the software identification information from the communication terminal device.

5. The communication device according to claim 1, wherein in the case where the NFC unit receives a polling signal from the communication terminal device, the NFC unit is configured to transmit a polling response to the communication terminal device so as to establish Near Field Communication and receive the software identification information from the communication terminal device.

6. The communication device according to claim 1, wherein the NFC unit is configured to switch the communication mode to the second mode when the communication terminal device is the reader/writer device, and to switch the communication mode to the first mode when the communication terminal device is the tag device.

7. A communication method for performing Near Field Communication with a communication terminal device by a communication device and processing, by software, information received from the communication terminal device via an antenna unit, and transmitting the information to a registration device connected via a communication network, the communication method comprising:

performing Near Field Communication with the communication terminal device via the antenna unit so as to receive software identification information and terminal identification information from the communication terminal device by switching to either one of two communication modes including (i) a first mode in which the communication device acts as a reader/writer device which transmits a polling signal to the communication terminal device and receives a polling response from the communication terminal device, and (ii) a second mode in which the communication device acts as a tag device which receives a polling signal from the communication terminal device and transmits a polling response to the communication terminal device, the software identification information identifying a software that processes the information received from the communication terminal device, and the terminal identification information identifying the communication terminal device;

acquiring corresponding software which is an item of software corresponding to the received software identification information, causing the acquired corresponding software to run, generating registration information containing the received terminal identification information of the communication terminal device, in accordance with an operation of the corresponding software caused to run, and transmitting the registration information to the registration device connected to the communication device via the communication network; and storing in a storage unit at least one item of software, wherein in the performing Near Field Communication, the communication mode is switched to the first mode in the case where the corresponding software is caused to run, in the case where the corresponding software is stored in the stored unit, the corresponding software is acquired from the storage unit and the acquired corresponding software is run, the communication device is connected via a communication network to a storage device which stores at least one item of software containing the corresponding software, the communication mode is switched to the second mode in the case where the polling signal from the communication terminal device has been received, and the communication method further comprises communicating with the storage device, determining whether or not the corresponding software is stored in the storage unit, based on the software identification information, when it is determined that the corresponding software is stored in the storage unit, the corresponding software is acquired from the storage unit and the acquired corresponding software is run, and when it is determined that the corresponding software is not stored in the storage unit, a software transmission request signal is transmitted to the storage device via the communication unit so as to acquire the corresponding software from the storage device and the acquired corresponding software is run, the software transmission request signal requesting transmission of the corresponding application.

* * * * *